(12) United States Patent
Espinoza et al.

(10) Patent No.: US 7,323,100 B2
(45) Date of Patent: Jan. 29, 2008

(54) COMBINATION OF AMORPHOUS MATERIALS FOR HYDROCRACKING CATALYSTS

(75) Inventors: Rafael L. Espinoza, Ponca City, OK (US); Keith H. Lawson, Ponca City, OK (US); Kandaswamy Jothimurugesan, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 11/180,089

(22) Filed: Jul. 13, 2005

(65) Prior Publication Data

US 2006/0011512 A1    Jan. 19, 2006

Related U.S. Application Data

(60) Provisional application No. 60/588,581, filed on Jul. 16, 2004.

(51) Int. Cl.
*C10G 47/02* (2006.01)
*B01J 23/00* (2006.01)
*B01J 21/00* (2006.01)
*B01J 20/00* (2006.01)

(52) U.S. Cl. .............. 208/111.3; 208/111.35; 502/242; 502/251; 502/263; 502/326; 502/351; 502/355; 502/407; 502/415; 502/439

(58) Field of Classification Search ........... 502/242, 502/251, 263, 351, 355, 407, 415, 439, 326
See application file for complete search history.

(56) References Cited

U.S. PATENT DOCUMENTS 3,108,945 A   10/1963   Weisz
3,124,541 A   3/1964   Wilson et al.
3,210,294 A   10/1965   Chomitz et al.
3,216,922 A   11/1965   O'Hars
3,243,368 A   3/1966   Mulaskey (Continued)

FOREIGN PATENT DOCUMENTS

EP    0 582 347    2/1994

(Continued)

OTHER PUBLICATIONS

PCT Written Opinion for International Application No. PCT/US05/24969 dated Sep. 18, 2006 (4 p.).

(Continued)

*Primary Examiner*—Cam N. Nguyen
(74) *Attorney, Agent, or Firm*—Conley Rose P.C.

(57) ABSTRACT

An amorphous support, methods for making the same and methods of using, particularly in hydrocracking. A method of making may comprise mixing a first amorphous material and a second amorphous material of different acidities to form a mixture, and treating by either separately treating the first and second amorphous materials before mixing or treating the mixture, so as to form an amorphous catalyst support. Treating preferably includes calcining. The acidity of the amorphous support may be modified by the different acidities of the precursor amorphous materials, their proportions in the mixture, and/or the order of the mixing and treating steps. A method of use may comprise reacting a hydrocarbon fraction with hydrogen over a hydrocracking catalyst comprising the amorphous catalyst support to form a hydrocracked product. Further embodiments include the first and second amorphous materials comprising silica-alumina, and/or differing in Brönsted acidity, Lewis acidity, or acidity index.

49 Claims, 5 Drawing Sheets

U.S. PATENT DOCUMENTS

| | | | |
|---|---|---|---|
| 3,449,265 A | 6/1969 | Gladrow et al. | |
| 3,542,670 A | 11/1970 | Erickson et al. | |
| 3,598,724 A | 8/1971 | Mulaskey | |
| 3,637,484 A | 1/1972 | Hansford | |
| 3,650,988 A | 3/1972 | Magee et al. | |
| 3,682,811 A | 8/1972 | Mulaskey | |
| 3,699,036 A | 10/1972 | Hass et al. | |
| 3,702,293 A | 11/1972 | Hayes et al. | |
| 3,804,747 A | 4/1974 | Kimberlin et al. | |
| 3,838,037 A | 9/1974 | Vaughan et al. | |
| 3,847,796 A | 11/1974 | Hilfman et al. | |
| 3,872,029 A | 3/1975 | Takase et al. | |
| 3,925,195 A | 12/1975 | Scherzer et al. | |
| 4,002,557 A | 1/1977 | Owen et al. | |
| 4,097,365 A | 6/1978 | Ward | |
| 4,121,996 A | 10/1978 | Hilfman | |
| 4,137,152 A | 1/1979 | Chester et al. | |
| 4,247,420 A | 1/1981 | Dumoulin et al. | |
| 4,302,358 A | 11/1981 | Pellet et al. | |
| 4,310,441 A | 1/1982 | Alafandi et al. | |
| 4,418,006 A | 11/1983 | Kim et al. | |
| 4,419,271 A | 12/1983 | Ward | |
| 4,584,089 A | 4/1986 | Unmuth et al. | |
| 4,894,142 A | 1/1990 | Steigleder | |
| 5,049,536 A | 9/1991 | Bellussi et al. | |
| 5,135,642 A | 8/1992 | Lambert | |
| 5,275,720 A | 1/1994 | Ward | |
| 5,314,881 A * | 5/1994 | Rapisarda | 514/99 |
| 5,324,881 A | 6/1994 | Kresge et al. | |
| 5,374,349 A | 12/1994 | Occelli | |
| 5,447,623 A | 9/1995 | Ward | |
| 5,464,527 A * | 11/1995 | Ward | 208/111.15 |
| 5,603,824 A * | 2/1997 | Kyan et al. | 208/208 R |
| 5,609,750 A | 3/1997 | Nat et al. | |
| 5,723,716 A | 3/1998 | Brandes et al. | |
| 5,851,378 A | 12/1998 | Vogt et al. | |
| 5,853,566 A | 12/1998 | Kraushaar-Czarnetzki et al. | |
| 5,968,344 A | 10/1999 | Perego et al. | |
| 6,174,429 B1 | 1/2001 | George-Marchal et al. | |
| 6,190,538 B1 | 2/2001 | Gosselink et al. | |
| 6,544,407 B1 | 4/2003 | Calemma et al. | |
| 6,670,295 B2 * | 12/2003 | Wang et al. | 502/66 |
| 6,723,297 B2 | 4/2004 | Chen et al. | |
| 2002/0160911 A1 | 10/2002 | Benazzi et al. | |
| 2003/0019788 A1 | 1/2003 | Benazzi et al. | |
| 2003/0057133 A1 | 3/2003 | Benazzi et al. | |
| 2003/0057134 A1 | 3/2003 | Benazzi et al. | |
| 2003/0057135 A1 | 3/2003 | Benazzi et al. | |
| 2004/0045874 A1 | 3/2004 | Bauer | |
| 2004/0092384 A1 | 5/2004 | Timken et al. | |
| 2005/0107479 A1 | 5/2005 | Espinoza et al. | |
| 2005/0119116 A1 | 6/2005 | Espinoza et al. | |

FOREIGN PATENT DOCUMENTS

| | | |
|---|---|---|
| EP | 1 101 813 | 5/2001 |
| WO | WO 91/17829 | 11/1991 |
| WO | WO 92/09366 | 6/1992 |
| WO | WO 97/20016 | 6/1997 |

OTHER PUBLICATIONS

PCT Search Report for International Application No. PCT/US05/24969 dated Sep. 18, 2006 (2 p.).

Ward, *The Nature of Active Sites on Zeolites III. The Alkali and Alkaline Earth Ion-Exchange Forms*, Journal of Catalysis 10, 34-46 (1968).

Ward, *The Detection of Acidity on Silica-Alumina Catalysts by Infrared Spectroscopy-Pyridine Chemisorption*, Journal of Catalysis 13, 154-160 (1969).

Manton and Davidtz, *Controlled Pore Sizes and Active Site Spacings Determining Selectivity in Amorphous Silica-Alumina Catalysts*, Journal of Catalysis 60, 156-166 (1979).

Connell and Dumesic, *The Generation of Bronsted and Lewis Acid Sites on the Surface of Silica by Addition of Dopant Cations*, Journal of Catalysis 105, 285-298 (1987).

Youssef, Nawar and Hamada, *Surface, Acidic and Catalytic Properties of Silica-Alumina Catalysts in Relation to their Chemical Composition*, Sil. Ind. vol. 62, p. 105-109.

Anderson, Bachiler-Baeza and Rosenberg, *Comparison of the Acid Properties on Sulphated and Phosphated Silica-Zirconia Mixed Oxide Catalysts.* "Catalysis in Application", Eds. S.D. Jackson, J.S.J. Hargreaves, D. Lennon (RSC, London, 2003); pp. 197-204.

Espinoza et al., *Catalytic Oligomerization of Ethene over Nickel-Exchanged Amorphous Silica-Aluminas: Effect of the Acid Strength of the Support*, Applied Catalysis 29 (1987) 295-303.

Corma et al., *Hydrocracking-hydroisomerization of n-decane on amorphous silica-alumina with uniform pore diameter*, Applied Catalysis A: General 152 (1997) 107-125.

Sie and Krishna, *Fundamentals and Selection of Advanced Fischer-Tropsch Reactors*, Applied Catalysis A: General 186 (1999) 55-70.

Emeis, *Determination of Integrated Molar Extinction Coefficients for Infrared Absorption Bands of Pyridine Adsorbed on Solid Acid Catalysts*, Journal of Catalysis 141, 347-354 (1993).

E. Selli et al, "Comparison between the surface acidity of solid catalysts determined by TPD and FTIR analysis of pre-adsorbed pyridine", Microporous and Mesoporous Materials, vol. 31, Issues 1-2, Oct. 1999, pp. 129-140, Elsevier Publisher.

S.M. Riseman et al, "Fourier transform infrared photoacoustic spectroscopy of pyridine adsorbed on silica-alumina and gamma-alumina", Journal of Physical Chemistry; 1982; vol. 86, Issue 10; pp. 1760-1763, American Chemical Society.

X. Liu et al, "DRFT-IR Studies of the Surface of gamma-Alumina", Journal of the American Chemical Society; 1997; vol. 119; Issue 41; pp. 9856-9860, American Chemical Society.

* cited by examiner

Figure 3
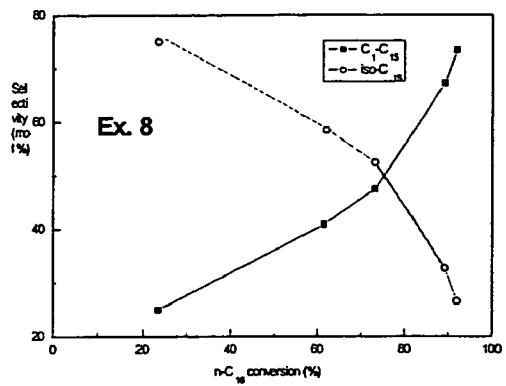
Fig. 3a
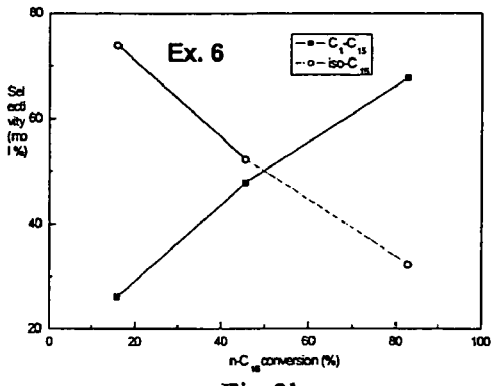
Fig. 3b
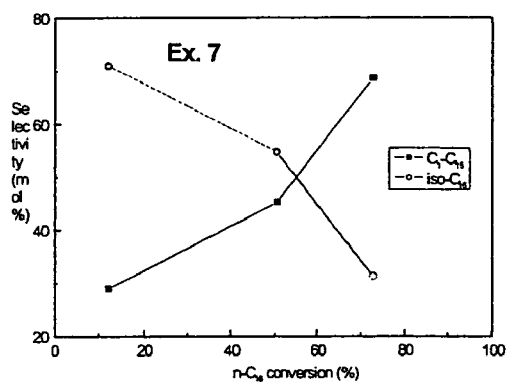
Fig. 3c
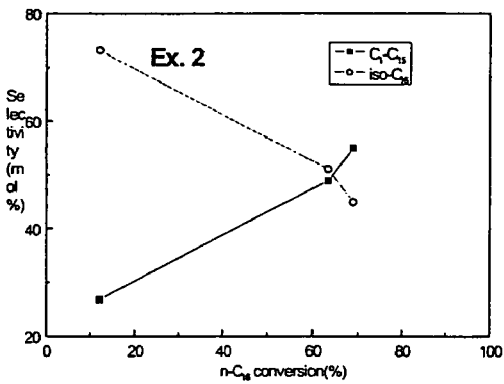
Fig. 3d
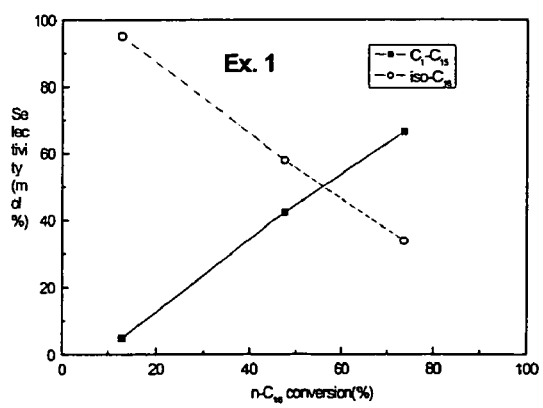
Fig. 3e
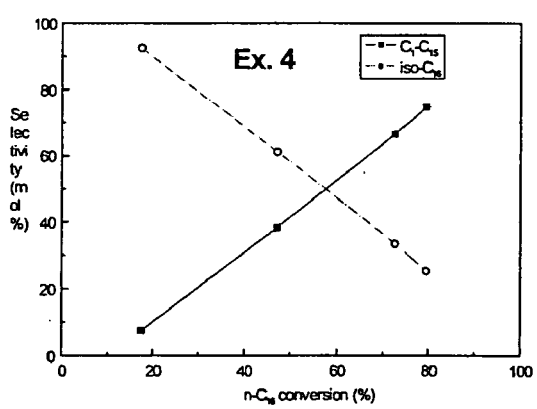
Fig. 3f

Figures 5
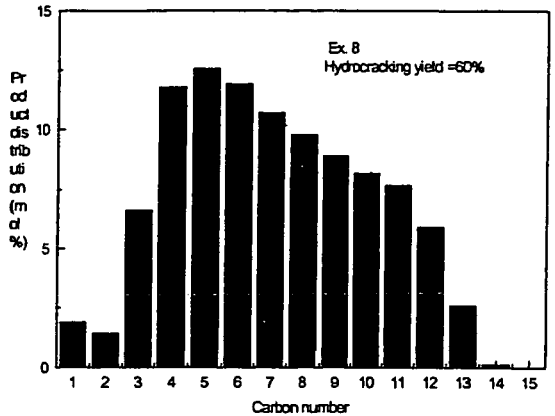
Fig. 5a
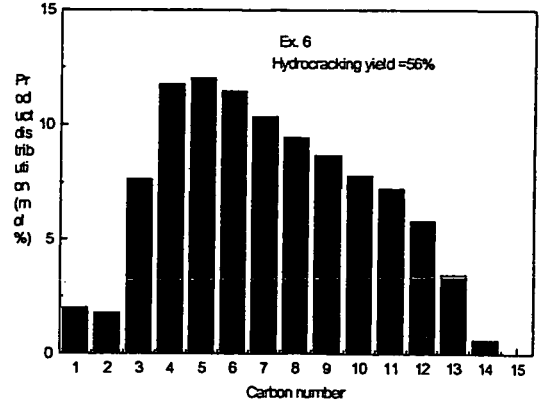
Fig. 5b
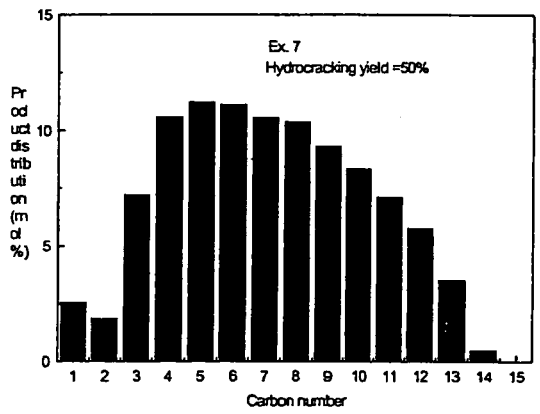
Fig. 5c
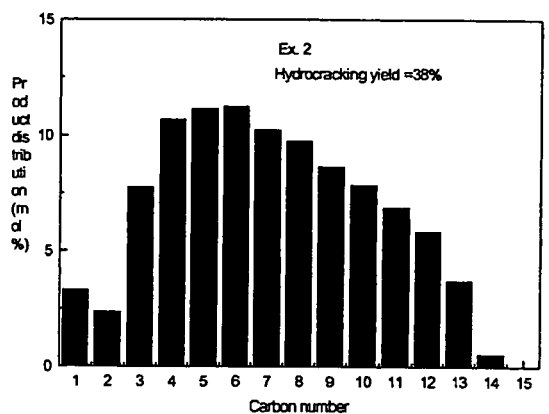
Fig. 5d
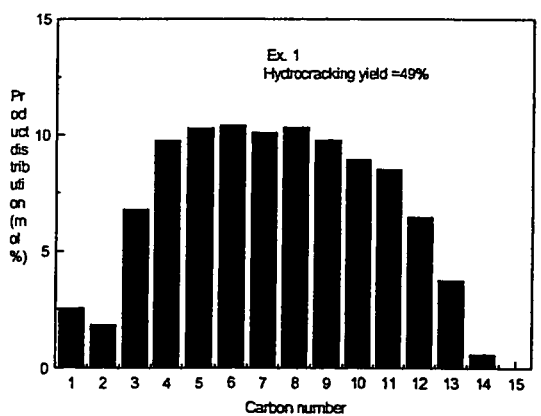
Fig. 5e
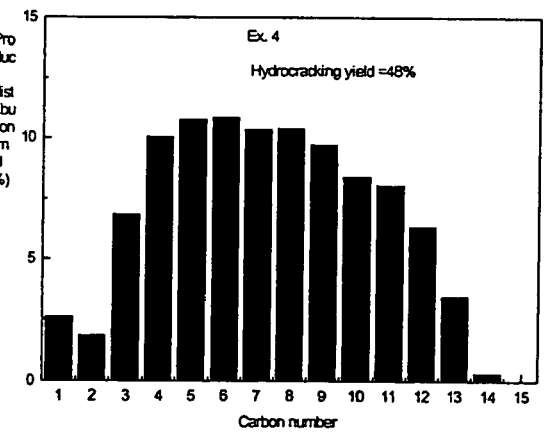
Fig. 5f

COMBINATION OF AMORPHOUS MATERIALS FOR HYDROCRACKING CATALYSTS

CROSS-REFERENCE TO RELATED APPLICATIONS

This non-provisional application claims the benefit of U.S. Provisional Application No. 60/588,581, filed Jul. 16, 2004, which is hereby incorporated by reference in its entirety.

STATEMENT REGARDING FEDERALLY SPONSORED RESEARCH OR DEVELOPMENT

Not applicable.

BACKGROUND OF THE INVENTION

1. Field of the Invention

This invention relates to the field of acidic amorphous materials suitable for catalytic supports and more specifically to the field of Fischer-Tropsch hydrocracking catalysts comprising acidic amorphous supports.

2. Background of the Invention

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due in part to the large volume occupied by a gas. Because the volume of a gas is so much greater than the volume of a liquid containing the same number of gas molecules, the process of transporting natural gas typically includes chilling and/or pressurizing the natural gas in order to liquefy it. However, this contributes to the final cost of the natural gas.

Further, naturally occurring sources of crude oil used for liquid fuels such as gasoline and middle distillates have been decreasing, and supplies are not expected to meet demand in the coming years. Middle distillates typically include heating oil, jet fuel, diesel fuel, and kerosene. Fuels that are liquid under standard atmospheric conditions have the advantage that in addition to their value, they can be transported more easily in a pipeline than natural gas, since they do not require the energy, equipment, and expense required for liquefaction.

Thus, for all of the above-described reasons, there has been interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane, the major chemical component of natural gas, is reacted with oxygen and/or steam to form synthesis gas, which is a combination of carbon monoxide and hydrogen. In the second transformation, which is known as Fischer-Tropsch synthesis, carbon monoxide is reacted with hydrogen to form organic molecules containing mainly carbon and hydrogen. Those organic molecules containing carbon and hydrogen are known as hydrocarbons. In addition, other organic molecules containing oxygen in addition to carbon and hydrogen, which are known as oxygenates, can also be formed during the Fischer-Tropsch synthesis. Hydrocarbons comprising carbons having no ring formation are known as aliphatic hydrocarbons and are particularly desirable as the basis of synthetic diesel fuel.

Typically, the Fischer-Tropsch product stream contains hydrocarbons having a range of numbers of carbon atoms, and thus has a range of molecular weights. Therefore, the Fischer-Tropsch products produced by conversion of synthesis gas commonly contain a range of hydrocarbons including gases, liquids and waxes. Depending on the molecular weight product distribution, different Fischer-Tropsch product mixtures are ideally suited to different uses. For example, Fischer-Tropsch product mixtures containing liquids may be processed to yield gasoline, naphtha, diesel, and jet fuel, as well as heavier middle distillates. Hydrocarbon waxes may be subjected to an additional hydroprocessing step for conversion to a liquid and/or a gaseous hydrocarbon. Thus, in the production of a Fischer-Tropsch product stream for processing to a fuel, it is desirable to maximize the production of high value liquid hydrocarbons, such as hydrocarbons with at least 5 carbon atoms per hydrocarbon molecule ($C_{5+}$ hydrocarbons).

The Fischer-Tropsch process is commonly facilitated by a catalyst. Catalysts desirably have the function of increasing the rate of a reaction without being consumed by the reaction. A feed containing carbon monoxide and hydrogen is typically contacted with a catalyst in a reaction zone that may include one or more reactors.

The catalyst may be contacted with synthesis gas in a variety of reaction zones that may include one or more reactors, either placed in series, in parallel or both. Common reactors include packed bed (also termed fixed bed) reactors and fluidized reactors, such as slurry bed reactors. Originally, the Fischer-Tropsch synthesis was carried out in packed bed reactors. These reactors have several drawbacks, such as temperature control, that can be overcome by gas-agitated slurry reactors or slurry bubble column reactors. Gas-agitated multiphase reactors comprising catalytic particles sometimes called "slurry reactors," "ebullating bed reactors," "slurry bed reactors" or "slurry bubble column reactors," operate by suspending catalytic particles in liquid and feeding gas reactants into the bottom of the reactor through a gas distributor, which produces small gas bubbles. As the gas bubbles rise through the reactor, the reactants are absorbed into the liquid and diffuse to the catalyst where, depending on the catalyst system, they are typically converted to gaseous and liquid products. The gaseous products formed enter the gas bubbles and are collected at the top of the reactor. Liquid products are recovered from the suspending liquid by using different techniques like filtration, settling, hydrocyclones, magnetic techniques, etc. Some of the principal advantages of gas-agitated multiphase reactors or slurry bubble column reactors (SBCRs) for the exothermic Fischer-Tropsch synthesis are the very high heat transfer rates, and the ability to remove and add catalyst online. Sie and Krishna (Applied Catalysis A: General 1999, 186, p. 55), incorporated herein by reference in its entirety, give a history of the development of various Fischer-Tropsch reactors.

An additional processing step for Fischer-Tropsch products is hydrocracking the Fischer-Tropsch wax. Hydrocracking typically includes reacting the wax over hydrocracking catalysts to convert the wax to hydrocarbon gases and/or liquids. The majority of catalysts currently used for hydrocracking as well as hydroisomerization are bi-functional in nature, and typically comprise a hydro-dehydrogenation component and a cracking component (typically an acid component). The hydro-dehydrogenation component may include one or more metals from Groups 8, 9 and 10 of the Periodic Table of elements (according to the new IUPAC notation) such as iron, cobalt, nickel, ruthenium, rhodium, palladium, osmium, iridium, and platinum. The hydro-dehydrogenation component may also typically include a combination of a Group 6 metal such as chromium, tungsten or molybdenum, with a metal from Groups 8, 9, and 10 (typically a non-noble metal such as iron, cobalt, and/or nickel). The cracking component for the hydrocracking catalyst is typically provided by a support with a large surface area (generally between 150 and 800 m$^2$/g) with a superficial acidity such as halogenated (chlorinated or fluorinated) aluminas, phosphorated aluminas, combinations of boron and aluminum oxides, or silica-aluminas, which may be amorphous or crystalline (the morphology being determined typically by means of X-ray diffractometry from powders).

The balance between the two, acid and hydro-dehydrogenation, functions can be a parameter that governs the activity and selectivity of a hydrocracking or hydroisomerization catalyst. A strong acid function combined with a weak hydro-dehydrogenating function typically produces catalysts that are highly active for hydrocracking. Thus, it is desirable to adjust the activity/selectivity balance of the bi-functional catalyst by the judicious choice of each component.

For the hydrocracking of hydrocarbons, the acidity (for instance the acid strength, the acid site distribution, the acidity index, and the like) of the cracking component in the bi-functional catalyst can play a role in the behavior of the bi-functional catalyst. For instance, the acidity of the cracking component typically affects the hydrocarbon conversion, i.e., the percentage of the hydrocarbons passing over the catalyst that get converted to smaller hydrocarbons. Acidity of cracking components in conventional hydrocracking catalysts is typically controlled by the composition of the cracking component, such as varying content in chorine or fluorine atoms in halogenated aluminas; content in phosphorus atoms in phosphorated aluminas; varying content in alumina in a silica-alumina material; or adding alkali elements such as Group 1 elements from the Periodic Table (like sodium, potassium) added to silica-aluminates (such as for example zeolite L). However, the composition of the cracking component is not the sole factor that affects the acidity of the cracking component. The method of preparation that is employed to make the cracking component can also impact its acidity. For example, it is possible to make various amorphous silica-alumina materials of different acidities that contain the same silica-to-alumina molar ratio. A typical method of changing the acidity of a structured aluminosilicate (i.e., zeolite) is to dealuminate the zeolite so as to decrease its alumina content. Drawbacks for these conventional methods include the inability to efficiently control the acidity of the cracking component. Further drawbacks include the need to use modifiers of superficial acidity, which add cost to the manufacturing costs. Moreover, these modifiers may affect the selectivity of the hydrocracking reaction.

Consequently, there is a need for a hydrocracking catalyst having a cracking component with a controlled acid strength, wherein the cracking component acid strength is not altered by the use of superficial acidity modifiers. Additional needs include a method for preparing an improved hydrocracking catalyst, said method allowing more efficient control of the acid function of the hydrocracking catalyst. Further needs include an improved method for hydrocracking of hydrocarbons, particularly of waxy hydrocarbons derived from a Fischer-Tropsch synthesis.

BRIEF SUMMARY OF SOME OF THE PREFERRED EMBODIMENTS

These and other needs in the art are addressed in one embodiment by an amorphous catalyst support suitable for making a hydrocracking catalyst. The amorphous catalyst support comprises a mixture of a first amorphous material and a second amorphous material, wherein the amorphous materials differ in acidity (e.g., acid strength, acid site distribution, acidity index, Brönsted acidity, Lewis acidity, and the like). In preferred embodiments, each of the first and second amorphous materials comprise or consist essentially of an amorphous mixed inorganic oxide, such as silica-alumina, silica-titania, silica-magnesia, or alumina-titania. The first and second amorphous materials may comprise or consist essentially of different amorphous mixed inorganic oxides (i.e., containing differing cations), but preferably comprise the same type of amorphous mixed inorganic oxide (i.e., containing same cations). In yet other preferred embodiments, each of the first and second amorphous materials comprise a synthesized material, (e.g., a synthetic amorphous mixed inorganic oxide such as synthetic amorphous silica-alumina).

The preparation of the amorphous catalyst support may include mixing at least two amorphous material gels and then calcining the gel mixture or mixing at least two calcined amorphous materials.

In one embodiment, the amorphous catalyst support is suitable for making a hydrocracking catalyst. The amorphous catalyst support comprises a mixture of a first amorphous material and a second amorphous material, wherein the first amorphous material comprises a Brönsted acidity measured at 150° C. between about 0.1 μmol pyridine/g and about 4 μmol pyridine/g. The second amorphous material comprises a Brönsted acidity measured at 150° C. that differs by at least 1 μmol pyridine/g from that of the first amorphous material. In an embodiment, the Brönsted acidity measured at 150° C. of the second amorphous material preferably is at least 1 μmol pyridine/g greater than that of the first amorphous material.

In another preferred embodiment, the present invention includes a catalyst support comprising a mixture of a first amorphous silica-alumina material and a second amorphous silica-alumina material. The first amorphous silica-alumina material and the second amorphous silica-alumina material differ in at least one property selected from the group consisting of acidity (e.g., acid strength), Brönsted acidity, Lewis acidity, BET surface area, total pore volume, average pore diameter, and silica-to-alumina molar ratio. Preferably, the amorphous silica-alumina materials differ in acid strength characterized by a Brönsted acidity measured at 150° C. of at least 1 micromole of pyridine per gram of catalyst support (μmol pyridine/g). Preferably, the catalyst support comprises an acid strength characterized by a Brönsted acidity measured at 150° C. between 2.5 μmol pyridine/g and 7 μmol pyridine/g.

A further embodiment includes a method of making an amorphous catalyst support, wherein the amorphous catalyst support is suitable for making a hydrocracking catalyst. The method comprises providing a first amorphous material and a second amorphous material, wherein the first amorphous material comprises a Brönsted acidity measured at 150° C. between about 0 μmol pyridine/g and about 4 μmol pyridine/g, and wherein the second amorphous material comprises a Brönsted acidity measured at 150° C. that differs by at least 1 μmol pyridine/g from that of the first amorphous material. The method also comprises mixing the first amorphous material and the second amorphous material to form a mixture. The first and second amorphous materials may be in the form of gels, and the mixture comprises mixed gels. Alternatively, the first and second amorphous materials may be in the form of powders, and the mixture comprises mixed powders. Alternatively, the first and second amorphous materials may be in the form of particles, and the mixture comprises mixed particles. In an embodiment, the particles may have a maximum characteristic size or average diameter greater than 0.25 mm. In addition, the method comprises treating the mixture or separately treating the first and second amorphous materials before the mixing step to form the amorphous catalyst support.

In some embodiments, the amorphous catalyst support is essentially free of zeolitic material (i.e., less than 1 wt. %).

In additional or alternate embodiments, the amorphous catalyst support is essentially free of crystalline material (i.e., less than 1 wt. %).

Another embodiment includes a hydrocracking catalyst comprising a catalytic metal deposited on the amorphous catalyst support of the present invention. The catalytic metal preferably includes a noble metal or oxide thereof; or alternatively, may include a Group 6 metal, a non-noble metal, or combinations thereof. The amorphous catalyst support is made by a method that comprises mixing two or more amorphous material gels and then calcining the gel mixture; or alternatively mixing two or more calcined amorphous materials, wherein the two or more amorphous materials differ in acidity. Each of the two or more amorphous materials preferably comprise a synthetic amorphous mixed inorganic oxide. The two or more amorphous materials more preferably comprise synthetic amorphous mixed inorganic oxides containing at least two cations that are the same, e.g., the two or more amorphous mixed inorganic oxides all comprise silicon and aluminum cations. The catalytic metal is deposited preferably by impregnation or ion-exchange, although other methods of deposition can be used.

Additional embodiments include a method for hydrocracking a hydrocarbon fraction. The method comprises providing a hydrocracking catalyst, wherein the hydrocracking catalyst comprises a catalytic metal and an amorphous support. The amorphous support comprises a mixture of a first amorphous material comprising a Brönsted acidity measured at 150° C. between about 0 μmol pyridine/g and about 4 μmol pyridine/g and a second amorphous material comprising a Brönsted acidity measured at 150° C. that differs by at least 1 μmol pyridine/g from that of the first amorphous material. Specifically, the Brönsted acidity measured at 150° C. of the second amorphous material is at least 1 μmol pyridine/g higher than that of the first amorphous material. In addition, the method comprises reacting the hydrocarbon fraction with hydrogen over the hydrocracking catalyst to form a hydrocracked product. In preferred embodiments, the hydrocarbon fraction is derived from a hydrocarbon synthesis, such as employing the Fischer-Tropsch synthesis, and said hydrocarbon fraction can contain at least 70% by weight of linear paraffins.

In one alternate embodiment, the amorphous catalyst support comprises a mixture of a first amorphous material comprising an acidity index between about 6 and about 200; and a second amorphous material comprising an acidity index that differs by at least 40 from that of the first amorphous material, and wherein the amorphous catalyst support comprises an acidity index between about 50 and about 1,250. Specifically, the acidity index of the second amorphous material is at least 40 higher than that of the first amorphous material.

In another alternative embodiment, the present invention comprises a method of making an amorphous material, wherein the amorphous material is suitable as a cracking component for making a hydrocracking catalyst. The method comprises providing a first amorphous material and a second amorphous material, wherein the first amorphous material comprises an acidity index between about 6 and about 200, and wherein the second amorphous material comprises an acidity index that differs by at least 40 from that of the first amorphous material; and mixing the first amorphous material and the second amorphous material to form a physical mixture. The method further comprises treating the physical mixture to produce an amorphous cracking component of a catalyst suitable for use in a hydroconversion process such as hydrocracking and/or hydroisomerisation.

An additional alternative embodiment includes a method for hydrocracking a hydrocarbon fraction. The method comprises providing a hydrocracking catalyst, wherein the hydrocracking catalyst comprises a catalytic metal and an amorphous cracking component, and wherein said catalytic material is deposited on said amorphous cracking component. The amorphous cracking component comprises a mixture of a first amorphous material comprising an acidity index between about 6 and about 200 and a second amorphous material comprising an acidity index that differs by at least 40 from that of the first amorphous material (e.g., the acidity index of the second amorphous material is at least 40 higher than that of the first amorphous material). The method further comprises reacting the hydrocarbon fraction with hydrogen over the hydrocracking catalyst to form a hydrocracked product.

A further alternative embodiment includes a method for hydrocracking a hydrocarbon fraction. The method comprises providing a hydrocracking catalyst, wherein the hydrocracking catalyst comprises a catalytic metal and an amorphous cracking component having an amorphous material comprising an acidity index of 100 or less, an amorphous material comprising an acidity index of at least 200, or combinations thereof, and wherein said catalytic metal is deposited on said amorphous cracking component. In addition, the method comprises reacting a hydrocarbon fraction with hydrogen over the hydrocracking catalyst to form a hydrocracked product.

Additional embodiments include the amorphous cracking component comprising a weight ratio of the first amorphous material to the second amorphous material between about 1:9 and about 9:1. Further embodiments include the first and second amorphous materials comprising silica-alumina.

It will therefore be seen that a technical advantage of the present invention includes producing amorphous cracking components that allow effective control over the acidity of the hydrocracking catalyst, which overcomes problems with conventional supports for hydrocracking catalysts. For instance, controlling the acidity of conventional hydrocracking catalysts is accomplished by, for example, adding one or more alkali elements, such as sodium and/or potassium, to reduce the acidity of a zeolite; adding one or more acidic elements, such as halogens or phosphorous to increase the acidity of a zeolite; or adjusting the alumina content in an aluminosilicate.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIGS. 3a-3f illustrate plots of hydroisomerization and hydrocracking as a function of n-hexadecane (n-$C_{16}$) conversion;

FIGS. 5a-5f illustrate distributions of hydrocracked products at hydrocracking yields.

DETAILED DESCRIPTION OF THE PREFERRED EMBODIMENTS

Figure 1:
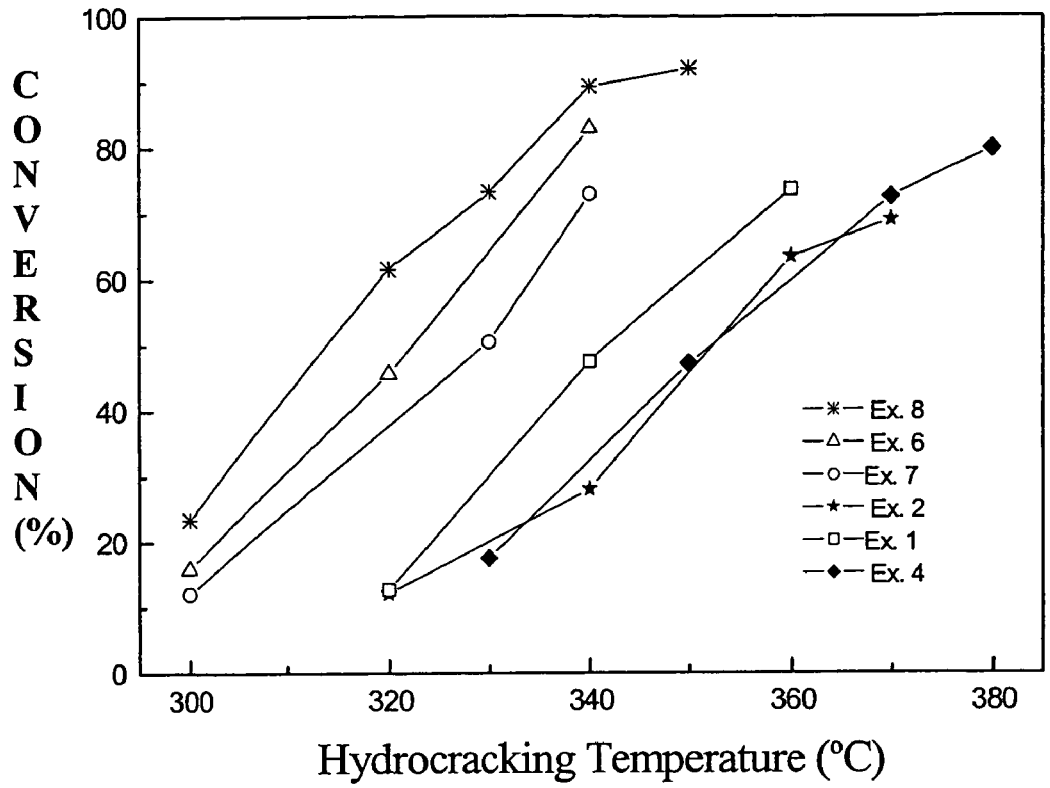
FIG. 1 illustrates a plot of n-hexadecane conversion versus reaction temperature.
Figure 2:
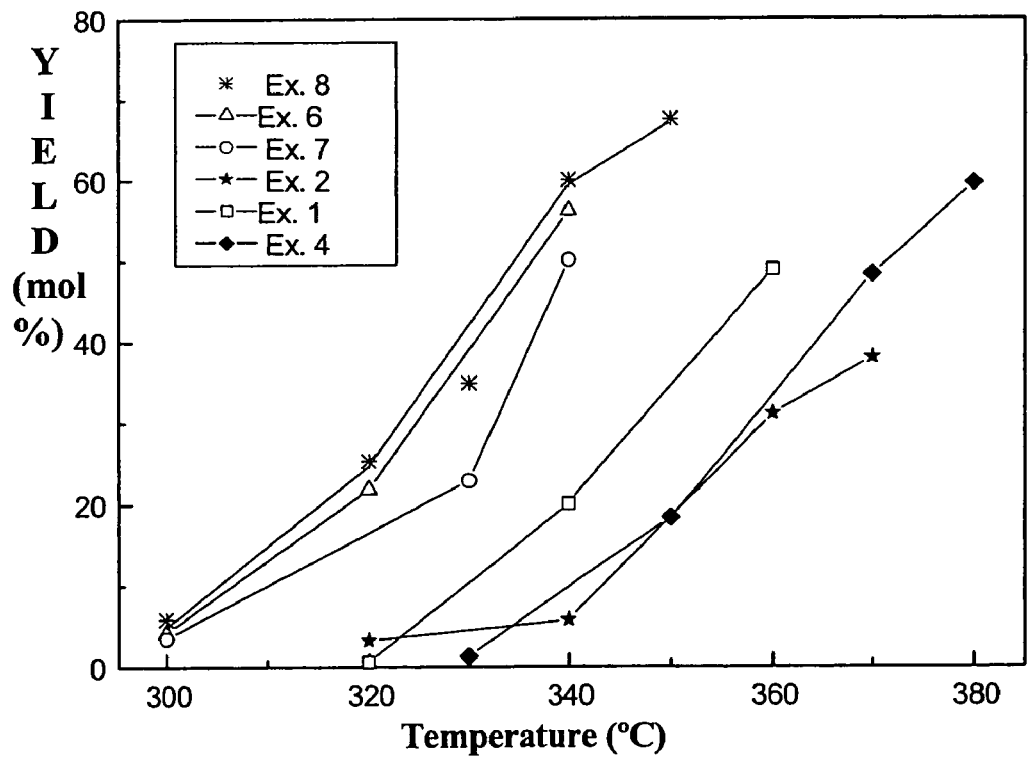
FIG. 2 illustrates a plot of yield versus temperature.

It has been discovered that the acidity of an amorphous support for hydrocracking catalysts can be effectively controlled by mixing two amorphous materials having different Brönsted acidities, different Lewis acidities, and/or different acidity indexes. A Brönsted acid is characterized by its ability to donate protons; i.e, a Brönsted acid may ionize to form a proton and its conjugate base. A Lewis acid is characterized by its ability to accept electrons. In other words, a Lewis acid may be an electron acceptor. Preferably, amorphous materials have Brönsted acidities that differ by at least one µmol pyridine/g from each other. Alternatively, one of the amorphous materials may have a high acidity index, and the other amorphous material may have a low acidity index. The preferred amorphous support is an amorphous silica-alumina support, with the amorphous materials comprising a low acidity silica-alumina (LASA) and a higher acidity silica-alumina (HASA).

In an embodiment, an amorphous support comprises a mixture of a first amorphous material and a second amorphous material. The first amorphous material comprises silica-alumina, silica-titania, silica-magnesia, or alumina-titania, preferably silica-alumina. The second amorphous material comprises silica-alumina, silica-titania, silica-magnesia, or alumina-titania, preferably silica-alumina. The first and second amorphous materials can comprise the same or different components, preferably the same components. Most preferably, both the first amorphous material and the second amorphous material comprise silica-alumina. The first and second amorphous materials are selected to provide an amorphous material having a desired Brönsted acidity. In one embodiment, the amorphous materials may have any desired Brönsted acidity. Preferably, the amorphous material has a Brönsted acidity measured at 150° C. between about 2.5 µmol pyridine/g and about 7 µmol pyridine/g; more preferably, between about 2.5 µmol pyridine/g and about 5 µmol pyridine/g. Alternatively, the amorphous material has a Brönsted acidity measured at 150° C. between about 4 nmol pyridine/$m^2$ and about 13 nmol pyridine/$m^2$; more preferably, between about 4.5 nmol pyridine/$m^2$ and about 9 nmol pyridine/$m^2$. In some embodiments, the amorphous material has a Lewis acidity measured at 150° C. between about 19 µmol pyridine/g and about 24 µmol pyridine/g or between about 30 nmol pyridine/$m^2$ and about 45 nmol pyridine/$m^2$. In some embodiments, the first amorphous material has a Brönsted acidity measured at 150° C. between about 0 µmol pyridine/g and about 4 µmol pyridine/g, alternatively between about 0.1 µmol pyridine/g and about 4 µmol pyridine/g, preferably between about 0.5 µmol pyridine/g and about 3 µmol pyridine/g, more preferably between about 1 µmol pyridine/g and about 3 µmol pyridine/g. Alternatively, the first amorphous material has a Brönsted acidity measured at 150° C. less than about 8 nmol pyridine/$m^2$, preferably between about 6 nmol pyridine/$m^2$ and about 7.5 nmol pyridine/$m^2$. Most preferably, the first amorphous material is a low acidity silica-alumina, also called LASA. In embodiments, the second amorphous material has a Brönsted acidity measured at 150° C. that differs by at least one µmol pyridine/g from that of the first amorphous material. Preferably, the second amorphous material has a Brönsted acidity measured at 150° C., which is at least about 1 µmol pyridine/g higher than that of the first amorphous material. More preferably, the second amorphous material has a Brönsted acidity measured at 150° C. between about 4 µmol pyridine/g and about 7 µmol pyridine/g. Most preferably, the second amorphous material is a higher-acidity silica alumina, (e.g. HASA). Alternatively, the second amorphous material has a Brönsted acidity measured at 150° C. more than about 10 nmol pyridine/$m^2$, preferably between about 10 nmol pyridine/$m^2$ and about 20 nmol pyridine/$m^2$. It is to be understood that the Brönsted acidity is measured at 150° C. Other suitable temperatures for such measurement may be higher than 150° C., such as for example at 250° C. and at 350° C.

In alternative embodiments, the first and second amorphous materials are selected to provide an amorphous material having a desired acidity index. The amorphous material may have any desired acidity index. In an embodiment, the amorphous material has an acidity index between about 50 and about 1,250; preferably, between about 70 and about 700. The first amorphous material may have an acidity index between about 6 and about 200. Preferably, the first amorphous material has an acidity index between about 6 and about 100. Most preferably, the first amorphous material is a LASA. The second amorphous material preferably has an acidity index that differs by at least 40 from that of the first amorphous material, e.g., the second amorphous material more has an acidity index that is at least 40 higher than that of the first amorphous material. Preferably, the second amorphous material has an acidity index between about 120 and about 1,250. More preferably, the second amorphous material is a HASA. Alternatively, the first amorphous material comprises an acidity index of 100 or less, and the second amorphous material comprises an acidity index of at least 200.

In an embodiment, an amorphous cracking component (e.g., support) can comprise the first amorphous material and the second amorphous material in any desired ratio to attain the desired Brönsted acidity, Lewis acidity and/or the desired acidity index. Preferably, the amorphous cracking component comprises a weight ratio of the first amorphous material to the second amorphous material between about 5:95 and about 95:5. More preferably, the amorphous cracking component comprises a weight ratio of the first amorphous material to the second amorphous material between about 1:10 and about 10:1. Still more preferably, the amorphous cracking component comprises a weight ratio of the first amorphous material to the second amorphous material between about 1:3 and about 3:1. In alternative embodiments, the amorphous cracking component comprises 99 wt. % or less of the first amorphous material or 99 wt. % or less of the second amorphous material.

It is to be understood that the acidity index may be determined by any method suitable for amorphous supports. In an embodiment, the acidity index is determined according to the following formula (1):

$$\text{Acidity index} = (\% \text{ conversion to DME}) + 20 \times (\% \text{ conversion to hydrocarbons}) \quad (1).$$

In the method using formula (1) with the amorphous support, the amorphous support is used to catalyze the conversion of methanol to hydrocarbons via a dimethylether intermediate (DME). Methods for using formula (1) to determine an acidity index of a material are described for example in R. L. Espinoza, et al. "Catalytic Oligimerization of Ethene over Nickel-Exchanged Amorphous Silica-Alumina: Effect of the Acid Strength of the Support," Applied Catalysis 29, pp. 295-303 (1987), which is hereby incorporated to the extent that it discloses such methods and is not contrary to the teachings of the present invention, and which discloses the use of formula (1) for determining an acidity index.

The amorphous cracking component can be used as support for hydrocracking catalysts. In addition to the amorphous cracking component, a hydrocracking catalyst may also comprise a hydro-dehydrogenation component such as a catalytic metal. The hydro-dehydrogenation component preferably comprises at least one metal catalytically active for hydrocracking hydrocarbon fractions. In particular, the hydro-dehydrogenation component of the hydrocracking catalyst comprises at least one metal from Groups 6, 8, 9, and 10 of the Periodic Table (new IUPAC notation). The hydro-dehydrogenation component preferably includes platinum (Pt), palladium (Pd), ruthenium (Ru), nickel (Ni), cobalt (Co), tungsten (W), molybdenum (Mo), or any combinations of two or more thereof. More preferably, the hydro-dehydrogenation component of the hydrocracking catalyst comprises palladium, platinum, or any combinations thereof. The hydrocracking catalyst preferably contains a catalytically effective amount of the catalytic metal. It is to be understood that the amount of catalytic metal present in the catalyst may vary widely. When the hydro-dehydrogenation component comprises a noble metal such as Pt or Pd, the hydrocracking catalyst preferably comprises from about 0.05 percent of the noble metal by weight (wt %) to about 2 wt % per total weight of the hydrocracking catalyst; more preferably from about 0.1 wt % to about 1 wt % of said noble metal; still more preferably from about 0.1 wt % to about 0.8 wt % of said noble metal. Alternatively, the hydrocracking catalyst may comprise from about 0.1 wt % to about 0.5 wt % of said noble metal. When the hydro-dehydrogenation component comprises a non-noble metal such as Co, Ni, W, Mo or any combination of two or more thereof, the hydrocracking catalyst preferably comprises from about 0.5 wt % to about 20 wt % of said non-noble metal; more preferably from about 0.5 wt % to about 15 wt % of said non-noble metal; still more preferably from about 1 wt % to about 15 wt % of said non-noble metal.

The hydrocracking catalyst may be prepared by any method known to one of ordinary skill in the art. In a preferred embodiment, the method comprises preparing a gel of the first amorphous material, preparing a gel of the second amorphous material, aging each gel for a suitable amount of time, mixing the aged gels to form a gel mixture, treating the gel mixture to form the amorphous cracking component, and depositing a hydro-dehydrogenation component to said amorphous cracking component.

In this embodiment, the preparation of the gels may be achieved by employing different methods so as to change the acidity (e.g., acid site density; acidity index; acid strength; Brönsted acidity; Lewis acidity) of the resulting amorphous material that may be obtained therein after aging and treating individually. For ease of description, the first amorphous material is considered to be the less acidic of the two amorphous materials.

One preferred method to prepare a gel of an amorphous material includes dispersing one or more precursors of the amorphous material in a solvent in the presence of a precipitation initiator so as to initiate precipitation and to form a gel, aging the gel, and washing the gel.

When the amorphous material comprises silica-alumina, the gel of the amorphous silica-alumina material is preferably formed by a method comprising mixing a soluble aluminum-containing compound and a soluble silicon-containing compound in a suitable solvent in the presence of a precipitation initiator under conditions suitable for forming a gel, aging the gel under suitable aging conditions, and washing the gel. As also used herein, a silica-alumina refers to a mineral, natural or synthetic, comprising oxygen, silicon and aluminum atoms wherein the atoms are arranged in a series of connected aluminate ($AlO_2^-$) and silicate ($SiO_4^{4-}$) ions. It is to be understood that the molar ratio of the soluble aluminum-containing compound and the soluble silicon-containing compound is selected to obtain the desired acidity of the resulting amorphous material and is typically selected so as to obtain a silica-to-alumina ratio between about 3:1 and about 500:1, preferably between about 10:1 and about 100:1, more preferably between about 30:1 and 80:1.

In an embodiment, the first and second amorphous materials are silica-alumina that are derived from two synthesized silica-alumina gels. In one embodiment, the two synthetical silica-alumina gels have the same silica-to-alumina volume ratio.

Suitable soluble aluminum-containing compounds include those capable of contributing aluminate ions ($AlO_2^-$) to a silica-alumina matrix. Such compounds may directly contain aluminate ions, such as, for example, sodium aluminate; or may generate aluminate ions upon reaction, as for example from the hydrolysis of aluminum triisopropoxide ($Al(iC_3H_7O)_3$). Examples of suitable aluminum-containing compounds include aluminum triisopropoxide ($Al(iC_3H_7O)_3$), sodium aluminate ($NaAlO_2$), aluminum nitrate ($Al(NO_3)_3$) and aluminum hydroxide ($Al(OH)_3$). In preparing a low-acidity silica-alumina gel or material, sodium aluminate is a preferred aluminum-containing compound. In preparing a higher acidity silica-alumina gel or material, aluminum hydroxide is a preferred aluminum-containing compound.

Suitable soluble silicon-containing compounds include those capable of contributing silicate ions ($SiO_4^{4-}$) to a silica-alumina material. Such compounds may directly contain silicate ions, such as, for example, sodium silicate or may generate silicate ions upon reaction, as for example from the hydrolysis of tetraethoxysilane. Examples of suitable silicon-containing compounds include tetraethoxysilane ($Si(C_2H_5O)_4$), silicic acid or sodium silicate ($Na_4SiO_4$). In preparing a low-acidity silica-alumina gel or material, sodium silicate is a preferred silicon-containing compound. In preparing a higher acidity silica-alumina gel or material, silicic acid is a preferred silicon-containing compound. Silicic acid may be purchased in particle form from 20 microns up to 200 microns. Alternatively, a sol of silicic acid may be obtained by passing a solution comprising a dissolved compound containing silicon such as a silicate compound (e.g., sodium silicate, magnesium silicate, or aluminum silicate) through an ion-exchange resin to substitute the silicon counterions with protons so as to form silicic acid. The pH during ion-exchange on the resin may be any desired pH, preferably between 2 and 3.

Suitable solvents in which soluble aluminum- and silicon-containing compounds may be mixed include any of the common organic solvents as for example, acetone, ethanol, isopropanol, ether and the like; as well as inorganic solvents, as for example, water. Water is a preferred solvent for use in preparing the gel for the amorphous silica-aluminas.

In an embodiment, a precipitation initiator may be used. Any suitable precipitation initiator may be used, such as acids (including nitric acid, acetic acid, hydrochloric acid, and/or formic acid) and bases (including urea, ammonia, tetrapropyl ammonium hydroxide, ammonium hydroxide and/or sodium hydroxide).

In one embodiment, the method employs a combination of two or more of any of the above silicon-containing and aluminum-containing sources and precipitation initiators.

The method further comprises aging the gel. Aging may be performed for a time between 0.5 hour and 18 days depending on the amorphous material precursors (or sources) and the desired acidity of the amorphous material present in the gel. As non-limiting examples, for a low-acidity silica-alumina gel, the aging is performed preferably at room or ambient temperature between 0.5 hour and 72 hours, and still more preferably between 1 hour and 24 hours; whereas, for a higher-acidity silica-alumina gel, the aging is performed first at room or ambient temperature between 3 days and 15 days, more preferably between 10 days and 14 days, and then at a temperature between 50° C. and 90° C., preferably at about 70° C., between 12 hours and 5 days, more preferabl between 2 days and 4 days, still more preferably at about 3 days.

When either (or both) of the silicon source and the aluminum source employed to make the silica-alumina gel comprises sodium, the method may further comprise contacting the aged gel with an ion exchange solution. Without being limited by theory, sodium may affect hydrocracking activity. Therefore, in some embodiments, careful removal of sodium cations during the preparation of the amorphous material or gel is preferred to obtain a suitable cracking component for the hydroconversion catalyst. Thus, the ion exchange solution may have a sufficient concentration of alternate cations to substitute the sodium cations derived from the silicon and/or aluminum sources. The contacting may be performed for a sufficient amount of time so as to exchange substantially all of the sodium cations by the alternate cations present in the ion-exchange solution. The ion exchange solution preferably comprises ammonium nitrate, ammonium carbonate, or combination thereof, so that ammonium cations exchange with substantially all of the sodium cations. The ion-exchange solution may be enriched in sodium cations and depleted in alternate cations and is thus termed "spent" after the ion-exchange step is completed.

The method further comprises washing the aged gel with a wash liquid. The washing step may be effective to remove any unprecipitated amorphous material precursor(s) (such as the silicon and aluminum sources in a silica-alumina gel), and/or to exchange cations with protons. If the optional ion-exchange step is performed between aging and washing, the washing step may be effective to remove the majority of the "spent" ion-exchange solution, which comprises most of, and preferably substantially all of, the sodium cations. The wash liquid is preferably water.

After aging the gel, optionally contacting the aged gel with an ion-exchange solution, and washing the aged gel, the amorphous material gel may then be mixed with another amorphous material gel. The different gels may comprise amorphous materials of similar compositions or of different compositions. The gel mixture may then be treated to form the amorphous cracking component of the hydrocracking catalyst. In an alternate embodiment, the amorphous material gel may be treated separately to form the amorphous material and then mixed with another amorphous material of a different acidity to form the amorphous cracking component of the hydrocracking catalyst.

In a preferred embodiment, the gel mixture comprises gels of different amorphous silica-alumina materials, wherein the silica-alumina materials differ in properties such as acid strength; BET surface area; total pore volume; average pore size; silica-to-alumina molar ratio; or any combination thereof. The different amorphous silica-alumina materials preferably differ in at least their acid strength. Without limitation, the amorphous silica-alumina materials of different acid strengths preferably have about the same silica-to-alumina molar ratio.

Preparing a Low-Acidity Silica-Alumina Gel

In a preferred embodiment, the method comprises making a low-acidity silica-alumina gel. In this preferred embodiment, a basic aluminum source and a basic silicon source are co-precipitated with the addition of acid. The precipitation method preferably comprises (a) mixing a basic silicon source and a basic aluminum source so as to form a sol corresponding to a desired silica-to-alumina molar ratio; and (b) adding an acid to form a gel. The acid addition initiates the precipitation. The basic aluminum source is preferably an aluminate compound such as sodium aluminate. The gel may also be called hydrogel. Other suitable basic aluminum sources include aluminum hydroxide. The basic silicon source is preferably a silicate compound such as sodium silicate. Other suitable basic silicon sources include tetraethylorthosilicate. The acid is preferably nitric acid. Other suitable acids include acetic acid or formic acid. Preferably, acid is added to the basic silicon and aluminum sources until a desired gelation pH is attained. When the silica-to-alumina ratio is between 10:1 and 1,000:1, the gelation pH is preferably greater than 10, more preferably between 10 and 12, so as to allow for the formation of a gel with an average pore size within a desirable range. The desirable range of average pore size may be between about 2 nanometers (nm) and about 12 nm, but is preferably between about 4 nm and about 9 nm. The average pore size of the silica-alumina gel is quite sensitive to the gelation pH, and very small pH changes may lead to significant changes in the average pore size. As an example, for a silica-to-alumina molar ratio of 70:1, a gelation pH of 11 may result in an average pore size of 14 nm, whereas a gelation pH of 10.67 may result in an average pore size of 8 nm. It is also envisioned that the precipitation method may comprise mixing a basic aluminum source with an acid, adding a basic silicon source to said mixture so as to obtain a silica-alumina gel at a desired gelation pH, and contacting the silica-alumina gel with an ion-exchange or wash solution so as to exchange counterions with protons and to form the $H^+$ form of an amorphous low-acidity silica-alumina gel.

Preparing a Higher-Acidity Silica-Alumina Gel

One of the amorphous material gels may be a higher-acidity silica-alumina gel (i.e., which may correspond to a material with an acidity index of more than about 200 or a Brönsted acidity at 150° C. of at least 6-7 µmol pyridine/g). In a preferred embodiment, the method comprises making a higher-acidity silica-alumina gel that comprises the co-precipitation of an aluminum source and a silicon source with the addition of a base, which initiates precipitation and a two-step aging process, first at room or close-to-room temperature, then at a higher temperature than room temperature (typically by heating the gel). The precipitation method to make a higher-acidity silica-alumina gel comprises mixing a compound of aluminum that may be hydrolyzed to aluminum oxide ($Al_2O_3$) and a compound of silicon that may be hydrolyzed to silicon oxide ($SiO_2$). Such compounds are mixed in a sufficient quantity of water to dissolve and hydrolyze them in the presence of a base, which initiates precipitation so as to form a higher-acidity silica-alumina gel. Preferably, the aluminum compound is mixed with the base first, and the silicon compound is added to the aluminum source/base mixture. Alternatively, the aluminum compound and the silicon compound are admixed first, and the base is added to the aluminum- and silicon-compounds admixture. The basic aluminum compound is preferably tetra alkyl ammonium compounds, including salts thereof, in which "alkyl" means methyl, ethyl, n-propyl or n-butyl, such as tetra methyl ammonium compounds including salts thereof, tetraethyl ammonium compounds including salts thereof, tetra propyl ammonium compounds including salts thereof, and tetra butyl ammonium compounds including salts thereof. The basic aluminum compound may also comprise cyclohexylamine, morpholine, di-n-propylamine (DPA), tripropylamine, triethylamine (TEA), triethanolamine, piperidine, cyclohexylamine, 2-methylpyridine, N,N-dimethylbenzylamine, N,N-diethylethanolamine, dicyclohexylamine, N,N-dimethylethanolamine, choline, N,N'-dimethylpiperazine, 1,4-diazabicyclo(2,2,2)octane, N',N',N,N-tetramethyl(1,6)hexanediamine, N-methyldiethanolamine, N-methyl-ethanolamine, N-methyl piperidine, 3-methyl-piperidine, N-methylcyclohexylamine, 3-methylpyridine, 4-methyl-pyridine, quinuclidine, di-n-butylamine, neopentylamine, di-n-pentylamine, isopropylamine, t-butylamine, ethylenediamine, pyrrolidine, 2-imidazolidone, or combinations thereof. The preferred base comprises a tetraethylammonium compound, such as tetraethyl ammonium hydroxide (TEAOH), tetraethyl ammonium phosphate, tetraethyl ammonium fluoride, tetraethyl ammonium bromide, tetraethyl ammonium chloride and tetraethyl ammonium acetate. The more preferred base for producing a higher-acidity silica-alumina gel is a tetra-alkyl ammonium hydroxide selected, for example, from tetraethyl-, propyl-, isopropyl-, butyl-, isobutyl-, terbutyl, and pentyl-ammonium hydroxide and among these, tetrapropyl-, tetraisopropyl- and tetrabutyl ammonium hydroxide are most preferred. The base may be added until the gelation pH is between about 9 and about 11 to achieve a desirable average pore size between about 4 nm and 9 nm.

The higher-acidity silica-alumina gel may be aged under suitable conditions as previously described. The making of a higher-acidity silica-alumina gel further includes drying the aged gel at a temperature between about 80° C. and about 140° C., preferably between about 110° C. and about 130° C., more preferably at about 120° C. for at least 0.5 hours; and a pressure from 0 to about 200 kPa (i.e., vacuum up to about 15 psig), preferably at about atmospheric pressure (i.e, 100-105 kPa). The dried higher-acidity silica-alumina gel may then be washed to remove excess base to form a $H^+$ form of a higher-acidity silica-alumina gel.

Alternate Method for Preparing a Higher-Acidity Silica-Alumina Gel

A higher-acidity silica-alumina gel may be advantageously prepared as disclosed in U.S. Pat. No. 5,049,536 and U.S. Pat. No. 5,968,344, each of which is herein incorporated by reference in its entirety; in particular, preparing an aqueous solution of tetra-alkyl-ammonium hydroxide (TAAOH) in which the alkyl is selected from among methyl, ethyl, n-propyl and n-butyl, of a soluble compound of aluminum capable of yielding alumina by hydrolysis, and of a soluble silicon compound capable of yielding silica by hydrolysis; with the amount of said constituents in said solution being such that the following molar ratios are compiled with a silica-to-alumina from 30:1 to 500:1; a TAAOH-to-silica from 0.05:1 to 0.2:1; and water-to-silica from 5:1 to 40:1. Such silica-alumina gel can result in a silica-alumina material with a higher acidity than that obtained from the low-acidity silica-alumina material gel, whose preparation method is previously described. The preferred soluble aluminum compounds are aluminum trialkoxides, such as aluminum tri-propoxide and aluminum tri-isopropoxide. The preferred soluble silicon compounds are the tetraalkyl silicates, such as, for example, tetra-ethyl silicate. The order of addition of the constituents of the solution is not critical. An aqueous solution is preferably formed initially, which contains the tetra-alkyl-ammonium hydroxide and the soluble aluminum compound, with the soluble silicon compound being then added to said solution. The resulting solution is heated typically at a temperature between about 50° C. and about 80° C., preferably between about 50 and about 60° C. in order to cause it to form a gel. The necessary time for the gelation to be completed varies as a function of temperature, of the concentrations, or of still other parameters, and is normally comprised within the range of from 15 minutes up to 5 hours, and is typically comprised within the range of from 25 to 60 minutes.

Mixing of Gels and Treating of Gel Mixture

The first gel comprising a low-acidity amorphous material and the second gel comprising a higher-acidity amorphous material are mixed to form a gel mixture. The proportions of the gels in the gel mixture may be determined by the desirable acidity of the resulting cracking component of the hydrocracking catalyst obtained after treatment. The gel mixture may comprise a weight ratio of first gel-to-second gel between about 5:95 and about 95:5, preferably between about 1:9 and about 9:1, more preferably between about 1:3 and about 3:1, still more preferably between about 1:2 and about 2:1, yet still more preferably of about 1:1.

The gel mixture can then be treated to form the amorphous support. Treating the gel mixture comprises drying and/or calcination. Treating the gel mixture preferably comprises drying the gel mixture preferably for between 1 and 48 hours, more preferably from 5 to 24 hours. The drying may occur at a temperature between 80° C. and 140° C., preferably between 110° C. and 130° C at a pressure between 0 and about 1,015 kPa (0 atm and about 10 atm), preferably between about 100 kPa and about 505 kPa (about 1 atm and about 5 atm), more preferably at about 101 kPa (about 1 atm). The drying preferably includes heating the gel mixture under an oxidizing atmosphere, such as air. The dried gel mixture described above may be used as a powder or may be formed into any desired shapes such as pills, cakes, extrudates, powders, granules, spheres, etc., and they may be utilized in any particular size.

Preferably, treating further comprises calcining the gel mixture for a period of time sufficient to transform the silicon-containing source and the aluminum-containing source to silica and alumina, preferably between 0.5 and 24 hours, more preferably between 1 and 10 hours. The calcination preferably occurs at a temperature between about 230° C. and about 800° C., more preferably between about 400° C. and about 600° C., at a pressure between 0 and about 1,015 kPa (0 and about 10 atm), more preferably between about 100 and about 505 kPa (about 1 atm and about 5 atm), still more preferably at about 101 kPa (about 1 atm). The calcination preferably includes heating the gel mixture in an oxidizing atmosphere, such as air or other suitable oxygen-containing gas.

In one embodiment, synthesized silica-alumina gels (e.g., first and second gels) may be separately calcined to form two calcined amorphous silica-aluminas, and then mixed to form the support. In another embodiment, these synthesized silica-alumina gels are mixed to form a gel mixture and then calcined.

The treated (dried and/or calcined) amorphous material may be in the form of powder and may be employed "as is." For the purpose of using the treated mixed amorphous material as the cracking component of a hydroconversion catalyst to support the hydro-dehydrogenation component in order to form a hydroconversion catalyst, the treated amorphous material preferably is properly sized for its intended use as a hydroconversion catalyst support. Preferably, after drying but before calcining, the treated amorphous material gel mixture is shaped into particles such as granules, beads, pills, pellets, cylinders, trilobes, extrudates, spheres or other rounded shapes, or another manufactured configuration such as irregularly shaped particles. A shaping step may include the mixing of the treated amorphous material gel mixture with a binding agent or binder. It is to be understood that the treated amorphous material may be made and successfully used without a binder. The binder, when employed, may comprise from about 0.1 to 50 weight %, preferably from about 1 to about 20 weight %, preferably from about 2 to about 10 weight % of the finished support. Any refractory inorganic oxide binder may be suitable as a binder. Without limitation, examples of suitable refractory inorganic oxides include silica, alumina, silica-alumina, magnesia, or mixtures thereof. Examples of binders that may be used include, but are not limited to, alumina, silica, bentonite, kaolin, or mixtures thereof. A preferred binder material is alumina. The treated amorphous material gel mixture and the optional binder can be mixed along with a peptizing agent such as hydrochloric acid (HCl), nitric acid (HNO₃), potassium hydroxide (KOH), and the like to form a homogeneous mixture, which is formed into a desired shape by shaping means. The desired shape may be formed by any suitable shaping means. Suitable shaping means include extrusion, spray drying, oil dropping, and conical screw mixing. Extrusion means include screw extruders and extrusion presses. The shaping means can determine how much water, if any, is added to the mixture. Thus, if extrusion is used, the mixture may be in the form of a dough, whereas if spray drying or oil dropping is used, then sufficient water may be present in order to form a slurry. The particles of the treated amorphous material may be in any suitable shape, for example spheres, cylinders, rings, granules, beads, pills, pellets, symmetric or asymmetric polylobes, for instance trilobes and quadrulobes, and trefoil or quatrefoil in cross-section. The particles preferably have a maximum characteristic size of 0.25-3 mm, preferably of 1-2 mm, more preferably of 1.2-1.8 mm. Extrudates preferably have a characteristic diameter of 0.25-6 mm, preferably of 0.25-3 mm; more preferably 1-2 mm, still more preferably of 1.2-1.8 mm. If no calcination is performed prior to shaping and/or if a binder (especially an organic binder) is employed during the shaping, the so-obtained shaped particles of the catalyst support are preferably calcined after the shaping step. In an alternate embodiment, the shaping step is performed after the calcination of the amorphous material gel mixture. The calcined material may be shaped into particulates, for example by crushing the calcined material and then passing the crushed material through a sieve so as to collect particulates within a desired size range. The desired particulate size depends on the type of catalyst bed in which the particulates are used. In preferred embodiments when the particulates of the hydroconversion catalyst support are used in a fixed bed arrangement, the desired average particulate size can be greater than about 0.25 millimeter (mm), such as between about 0.25 mm and about 6 mm. Preferably, the desired average particulate size is between about 0.25 mm and about 3 mm; more preferably between about 1 mm and 2 mm; still more preferably between about 1.2 mm and 1.8 mm. Alternatively, when the particulates of the hydroconversion catalyst support are used in a fluidized bed arrangement, the desired average particulate size is typically less than about 0.25 mm.

Preparing the Catalyst Cracking Component by Physical Mixing of Amorphous Materials An alternate method for making the cracking component of the hydrocracking catalyst includes forming separately at least two amorphous materials of different acidity strength. Each amorphous material can be made by a procedure that includes making an amorphous material gel with one or more amorphous material precursors in the presence of a precipitation initiator, aging the amorphous material gel, washing the aged amorphous material gel, and treating the washed amorphous material gel. Without being limited by theory, the selection of the amorphous material precursors, the proportion of two or more amorphous material precursors, the selection of the precipitation initiator, and the aging period are factors that may influence the acid strength of each of the resulting dried amorphous materials. Treating includes at least drying. Treating may be followed by the shaping of the treated amorphous material gel into particles. Shaping is preferably accomplished prior to the mixing of the amorphous materials of different acid strengths; however, it is envisioned that the shaping of the resulting support may be performed after the physical mixture of the treated amorphous materials. A calcination step can be performed separately on each dried amorphous material before or after a shaping step (preferably after shaping). Alternatively or additionally, a calcination step can be performed on the mixture of the dried amorphous materials.

Particulate Support Comprising the Amorphous Material

Either, after drying and/or calcining the gel mixture of at least two amorphous materials characterized by different acid strengths or before the physical mixing of at least two dried and/or calcined amorphous materials of different acid strengths, it is preferred that the catalyst support comprising the mixed amorphous materials and optionally a binder be properly sized for the intended use of the hydroconversion catalyst made therefrom. For using the hydroconversion catalyst in a fixed bed, the catalyst support may comprise particles of size greater than about 0.25 millimeter (mm), preferably between about 0.25 mm and about 3 mm, more preferably between about 1 mm and about 2 mm. Alternatively, for using the hydroconversion catalyst in a fluidized bed, the catalyst support comprising the mixed amorphous materials and optionally a binder may comprise particles of size less than about 250 microns, preferably less than about 210 microns.

The support of the hydroconversion catalyst comprising optionally a binder and the mixed amorphous materials (as cracking component) preferably comprise an amorphous silica-alumina material having a silica-to-alumina molar ratio between 3:1 and 500:1, preferably between 5:1 and 200:1, more preferably between 10:1 and 100:1, still more preferably between 30:1 and 100:1. In an embodiment, the amorphous silica-alumina material may have a surface area greater than about 300 m$^2$/g, preferably between about 300 m$^2$/g and about 800 m$^2$/g; a total pore volume between about 0.5 ml/g and about 1.2 ml/g, preferably between about 0.6 ml/g and about 0.95 ml/g; and an average pore size between about 2 nm and about 12 nm, preferably between about 4 nm and about 9 nm.

In some embodiments, the amorphous material used as the cracking component for the hydroconversion (i.e. hydrocracking and/or hydroisomerization) catalyst can comprise a mixture of a first amorphous silica-alumina material and a second amorphous silica-alumina material with a weight ratio of first silica-alumina material to second silica-alumina material between about 5:95 and about 95:5, preferably between about 1:9 and about 9:1, more preferably between about 1:3 and about 3:1, still more preferably about between about 1:2 and about 2:1, still yet more preferably of about 1:1. Preferably, the first and second amorphous silica-alumina materials are in the form of particulates prior to their admixture. The size of particulates of the first and second amorphous silica-alumina materials are preferably within a similar size range, more preferably with an average size between about 0.25 and about 3 mm; still more preferably with an average size between about 1 and about 2 mm; yet still more preferably with an average size between about 1.2 and about 1.8 mm; however, in some embodiments, the particulates of the first and second amorphous silica-alumina materials may not necessarily have the same average size.

In other embodiments, the amorphous material used as the cracking component for the hydroconversion (i.e. hydrocracking and/or hydroisomerization) catalyst consists essentially of a treated mixture of a first amorphous silica-alumina gel and a second amorphous silica-alumina gel with a weight ratio of first silica-alumina gel to second silica-alumina gel between about 5:95 and about 95:5, preferably between about 1:9 and about 9:1, more preferably between about 1:3 and about 3:1, still more preferably between about 1:2 and about 2:1, still more preferably of about 1:1. The treatment preferably includes drying of the mixture of at least two silica-alumina gels and calcining the dried gel mixture. The dried gel mixture is preferably shaped into particles before it is calcined.

The first amorphous silica-alumina material preferably may be characterized by an acid strength measured by pyridine titration of Brönsted acid sites at 150° C. between about 0.1 and about 4 µmol pyridine per gram (µmol pyr/g); preferably between about 0.5 µmol pyr/g and about 3 µmol pyr/g; more preferably between about 1 µmol pyr/g and about 3 µmol pyr/g. The second amorphous silica-alumina material preferably is characterized by a Brönsted acidity differing by at least 1 µmol pyr/g from that of the first amorphous silica-alumina material. Preferably, the second amorphous silica-alumina material has an acid strength measured by pyridine titration of Brönsted acid sites at 150° C. greater than about 4 µmol pyr/g; more preferably between about 4 µmol pyr/g and about 7 µmol pyr/g.

Alternatively, the first amorphous material (or the gel of the first amorphous material corresponds to a first amorphous material which) is characterized by an acidity index between about 6 and about 200, preferably between about 6 and about 100; and the second amorphous material (or the gel of the second amorphous material corresponds to a second amorphous material which) is characterized by an acidity index that differs by at least 40 from that of the first amorphous material, so that the resulting mixed amorphous material used as the cracking material for the hydroconversion catalyst preferably has an acidity index between about 50 and about 1,250. Preferably, the second amorphous material (or the gel of the second amorphous material corresponds to the second amorphous material) has an acidity index between about 120 and about 1,250.

Preparation of Hydroconversion Catalyst

In an embodiment, the hydro-dehydrogenation component of the hydrocracking catalyst may be uniformly distributed onto the porous surface of the support, which may maximize the effectively active catalytic surface. One or more metals comprising the hydro-dehydrogenation component of the hydroconversion catalyst may be deposited on the cracking component by any suitable method, such as chemical vapor deposition, plasma sputtering, impregnation, ion-exchange, precipitation and the like. The hydro-dehydrogenation component (i.e., one or more catalytic metals) is preferably added either by impregnation or by ion exchange.

The one or more metals comprising the hydro-dehydrogenation component of the hydroconversion catalyst may be impregnated on the support by any suitable method. Preferred methods of impregnation of a suitable hydro-dehydrogenation component include incipient wetness impregnation, also called pore volume impregnation as a volume representing about 70 to about 100% of the pore volume of a solution containing at least one catalytic material or at least one catalytic material precursor is applied to the support. Incipient wetness impregnation preferably proceeds by dissolving at least one compound comprising a catalytic metal in a minimal amount of solvent sufficient to fill the pores of the support. The solvent may be suitable for dissolving one or more sources of said catalytic metal, such as water and non-aqueous solvents (e.g., toluene, methanol, ethanol, and the like). One of ordinary skill in the art will be able to select the most suitable solvent for a given catalytic metal or a compound, precursor or source of the catalytic metal. The catalytic metal can be in the form of a salt or a zero-valent compound. Another method is to impregnate the cracking component with a solution of zero valent metal or the like. It is to be understood that impregnation can be done in a single step or multiple steps. If the hydro-dehydrogenation component comprises more than one catalytic metal, then the catalytic metals can be deposited by co-impregnation (applied simultaneously onto the cracking component) or by successive impregnation steps. Another method of preparing a catalyst by impregnating a catalytic material onto a support includes impregnating the support with a molten salt of a catalytic metal or promoter. Thus, another method includes preparing the supported metal catalyst from a molten metal salt. When a catalytic material is impregnated as a precursor of the material, e.g. a salt or zero valent compound, one of ordinary skill in the art will be able to select the most suitable precursor.

More particularly, according to the deposition method based on impregnation, the amorphous cracking component, prepared as disclosed above, is wetted with a solution of a compound of a selected metal, for example a metal from groups 6, 8, 9 or 10 of the Periodic Table, and particularly a compound of a noble metal, such as chloroplatinic acid hexahydrate [also called hexachloroplatinate(IV) hexahydrate; $H_2Cl_6Pt(H_2O)_4$], tetraamminoplatinum nitrate [Pt $(NH_3)_4(NO_3)_2$], tetraamminoplatinum hydroxide [$Pt(NH_3)_4$ $(OH)_2$], or hexaammino platinu hydroxide [$Pt(NH_3)_6$ $(OH)_4$], at ambient or close-to-ambient temperatures. After impregnation, the impregnated material is dried, preferably in air, at ambient or close-to-ambient temperature, and is submitted to a calcination under an oxidizing atmosphere, preferably in air. Suitable temperatures for this calcination are from 200° C. to 600° C. The conditions are so adjusted that a noble metal is deposited on particles of the amorphous cracking component, in an amount within the range of from about 0.05 to about 5% by weight, preferably of from about 0.1 to about 1%; more preferably of from about 0.1 to about 0.5%; or alternatively, a non-noble Group 8-10 metal with optionally a Group 6 metal can be deposited in an amount within the range of from about 0.5 to about 5% by weight, preferably of from about 1 to about 8%; more preferably of from about 1 wt % to about 5 wt %. When the hydro-dehydrogenation component comprises more than one metal such as a combination of a group 6 metal and at least one non-noble metal from Groups 8, 9, and 10 (typically Co—Mo, Ni—Mo, Co—W or Ni—Co—Mo combinations), the deposition of the metals can proceed by multiple impregnation step, each impregnation step being followed by a drying step and optionally a calcination. The calcination step may not be necessary in between impregnation steps; and at least one calcination step is preferably performed after the last impregnation and drying cycle takes place.

Ion exchange of catalytic metals to a support may comprise applying an aqueous solution of at least one compound comprising a catalytic metal. Preferably, ion exchange includes the deposition of a noble metal such as platinum, palladium, or combination thereof, onto particles of the amorphous cracking component so as to incorporate the noble metal in form of ions onto exchange sites present in the amorphous cracking component; draining the aqueous solution from the particles; and treating the drained particles. Methods for ion exchange are disclosed for example in U.S. Pat. Nos. 3,637,484 and 5,968,344, each of which is hereby incorporated in its entirety to the extent that they teach ion exchange and to the extent that their teachings are not contrary to the teachings of the present application.

According to the deposition method based on ion exchange, the cracking component in the form of particles can be suspended in a solution of a catalytic metal compound. The catalytic metal compound is preferably a water-soluble salt of a catalytic metal selected from Groups 6, 8, 9, and 10 of the Periodic Table. The catalytic metal preferably comprises a noble metal, particularly platinum and/or palladium. The solution of the catalytic metal compound preferably comprises a salt or complex of said noble metal, either in anhydrous form or in hydrate form, such as for non-limiting examples, chloroplatinic acid [$H_2PtCl_6$] or in hydrate form, hexachloroplatinate(IV) hexahydrate [$H_2Cl_6Pt(H_2O)_4$], tetraamminoplatinum nitrate [$Pt(NH_3)_4$ $(NO_3)_2$], tetraamminopalladium nitrate [$Pd(NH_3)_4(NO_3)_2$], tetraamminoplatinum hydroxide [$Pt(NH_3)_4(OH)_2$], hexaamminoplatinum hydroxide [$Pt(NH_3)_6(OH)_4$], operating at room or close-to-room temperature, and at a pH value comprised within the range of from about 5.5 to about 10, preferably between about 5.5 and about 7. The use of complex hydroxides, nitrates or chlorides may facilitate directing the exchange of the complex metal ions into the exchange (typically acidic) sites associated with the support (i.e., the cracking component). After the ion-exchange, the particles can then be separated from the solution by means of filtration and/or decanting, washed with deionized water to form a hydroconversion catalyst precursor, which is then finally treated. The treatment of the hydroconversion catalyst precursor can include drying. Drying the hydroconversion catalyst precursor preferably occurs at temperatures between about 80° C. and about 140° C., more preferably between about 110° C. and about 130° C. Typically, drying proceeds for from about 2 to about 16 hours at pressures between 0 kPa and about 500 kPa (vacuum to about 60 psig), preferably between about 90 kPa to about 200 kPa (about −2 psig to about 15 psig), more preferably between about 90 to about 120 kPa (about −2 to 3 psig). Alternatively or in combination to drying, treating the hydroconversion catalyst precursor includes calcination so as to form the hydroconversion catalyst. Calcining the hydroconversion catalyst precursor preferably occurs at temperatures between about 200° C. and about 600° C., more preferably between about 225° C. and about 400° C. Typically, calcination proceeds for from about 2 to about 6 hours at pressures between about 100 kPa and about 200 kPa (about 0 psig to about 15 psig), more preferably between about 90 kPa and about 120 kPa (about −2 to 3 psig).

In other embodiments, the methods for preparing the hydroconversion catalyst comprise separately depositing at least one catalytic metal to powders or particles of the first and second amorphous materials, mixing the two deposited amorphous materials comprising the at least one catalytic metal. Alternatively, the methods comprise mixing powders or particles of the first and second amorphous materials to form a physical mixture, treating the physical mixture to form the cracking component (serving as support), and depositing at least one catalytic metal to the cracking component.

In preferred embodiments, in which the cracking component comprises amorphous silica-alumina powder or particles, the conditions for the catalyst preparation are controlled, so that an amount of a noble metal (typically Pt and/or Pd, preferably Pt) comprised within the range of from 0.05 to 1% by weight, preferably of from 0.1 to 1%, more preferably of from 0.1 to 0.8%, or alternatively from 0.1 to 0.5%, is deposited on the silica-alumina particles.

Hydroconversion Catalysts

After the deposition of a hydro-dehydrogenation component onto a cracking component, whether being by ion-exchange and/or by impregnation, a bi-functional catalyst can be obtained. The bi-functional catalyst comprises a hydro-dehydrogenation component characterized by at least one noble metal from Groups 8, 9, and 10; or the combination of a Group 6 metal and at least one non-noble metal from Groups 8, 9, and 10, wherein said hydro-dehydrogenation component is deposited on an amorphous material with a controlled acid strength. The preferred amorphous material with a controlled acid strength comprises a mixed silica-alumina material having a silica-to-alumina molar ratio between 3:1 and 500:1, preferably between 5:1 and 200:1, more preferably between 10:1 and 100:1, still more preferably between 30:1 and 100:1. The controlled acid strength of the mixed silica-alumina material is preferably characterized by a Brönsted acidity measured at 150° C. between 2.5 and 7 µmol pyr/g. The mixed silica-alumina material in general has a BET surface area greater than about 300 m²/g, preferably between about 300 m²/g and about 800 m²/g, more preferably between about 400 m²/g and about 700 m²/g; average pore volume between about 0.5 ml/g and about 1.2 ml/g, preferably between about 0.6 ml/g and about 0.95 ml/g; and an average pore size between about 2 nm and about 12 nm, preferably between about 4 nm and about 12 nm, more preferably between about 4 nm and about 9 nm.

The hydroconversion catalyst can be activated prior to use by drying and/or reduction, preferably by drying and subsequent reduction. The drying is carried out in an inert atmosphere or under a reducing atmosphere (such as with hydrogen) at a temperature comprised within the range of from 100° C. to 400° C. The reduction is obtained by means of the thermal treatment of the hydroconversion catalyst under a reducing atmosphere (i.e., with a reducing gas comprising mainly hydrogen; more than 80 vol. % $H_2$ is preferred) at temperatures comprised within the range of from 150° C. to 500° C. Such reduction can increase the selectivity characteristics of the hydroconversion catalyst thereof. The activation step (e.g., drying and/or reduction) can be carried out before the start of the hydroconversion operation, either ex situ (i.e., in a separate vessel than the reactor vessel where the hydroconversion takes place) or in situ (i.e., while the hydroconversion catalyst is disposed inside the hydroconversion reactor vessel).

The hydroconversion catalyst can be employed in any hydroconversion process, for instance a hydrocracking unit or a hydroisomerization unit, preferably in a hydrocracking unit.

Method of Hydrocracking

The hydroconversion catalyst is preferably used in a hydrocracking process. Hydrocracking may occur at any suitable reactor conditions that achieve a desirable hydrocracked product. Hydrocracking typically takes place in a hydrocracker wherein a hydrocarbon feedstream and hydrogen are passed over a hydrocracking catalyst under suitable conversion promoting conditions so as to react some of the hydrocarbon components with hydrogen over the hydrocracking catalyst and to form the hydrocracked product. The acidity of the hydrocracking catalyst affects the conversion of the hydrocarbon feedstream. Preparing the hydrocracking catalyst with a controlled acid strength (either characterized by Brönsted acidity measured at 150° C. by pyridine titration or by acidity index) allows for improved control in the behavior of the hydrocracking catalyst and thereby improved control over conversion of the hydrocarbon components in the hydrocarbon feedstream The hydroconversion catalyst may be used as a hydrocracking catalyst to hydrocrack a liquid hydrocarbon feedstream from any process including conventional refinery processes, hydrocarbon synthesis processes, and the like. It is to be understood that the source of the liquid hydrocarbon feedstream is not critical; however, in a preferred embodiment, the liquid hydrocarbon feedstream includes hydrocarbon products with at least 20 or more carbon atoms ($C_{20+}$ hydrocarbons), also termed waxy hydrocarbons, generated in a hydrocarbon synthesis process. A preferred hydrocarbon synthesis process employing the Fischer-Tropsch synthesis will be discussed in more detail below. A more preferred hydrocarbon synthesis process comprises a low-temperature Fischer-Tropsch synthesis, such as employing a temperature between about 370° F. and about 500° F. (190° C.-260° C.).

The liquid hydrocarbon feedstream to the hydrocracking unit may further contain hydrocarbons from other sources, for example hydrocarbons from crude oil refining or from processing of shale oils and/or tar sands. For example, Fischer-Tropsch $C_{20+}$ hydrocarbon products can be combined with one or more high boiling range fractions obtained from a distillation of crude oil and/or with one or more heavy boiling range fractions obtained from vacuum distillation, de-oiling and de-waxing processes or from processing of shale oils or tar sands, in order to form the hydrocarbon feedstream to the hydrocracking unit.

Hydrocarbon feedstream to the hydrocracking unit can comprise primarily $C_{20+}$ hydrocarbons, some of which are saturated hydrocarbons (i.e., have no unsaturated carbon-carbon bonds) such as alkanes, and some of which may be unsaturated hydrocarbons (i.e., have unsaturated carbon-carbon bonds) such as alkenes (also called olefins). Fresh liquid hydrocarbon feedstream (i.e., excluding a recycle stream from the hydrocracking unit effluent) to the hydrocracking unit can contain at least 70% by weight of linear paraffins, preferably at least 75% by weight of linear paraffins, more preferably at least 85% by weight of linear paraffins. Liquid hydrocarbon feedstream to the hydrocracking unit can contain up to 25% by weight of olefins, preferably up to 15% by weight of olefins, more preferably up to 10% by weight of olefins. The hydrocracking hydrocarbon feedstream may also comprise some cyclic compounds such as aromatics, but the aromatic content may be less than 1% by weight. The hydrocracking hydrocarbon feedstream may also comprise heteroatomic compounds such as sulfur-containing compounds (e.g., thiols, thiophenes, benzothiophenes, and the like); nitrogen-containing compounds (e.g., amines); and oxygenated hydrocarbons also called oxygenates (e.g., alcohols, aldehydes, esters, ketones, and the like). The hydrocracking hydrocarbon feedstream can contain up to 10% by weight of oxygenates, preferably up to 5% by weight of oxygenates, but may contain less than 0.1 percent by weight of sulfur-containing and nitrogen-containing compounds.

The liquid hydrocarbon feedstream to the hydrocracking unit preferably comprises a hydrocarbon fraction from a hydrocarbon synthesis process such as employing the Fischer-Tropsch synthesis. The hydrocarbon fraction may be obtained by feeding a hydrocarbon synthesis product stream to a fractionator in order for its components to be separated based on their boiling point, so as to generate various hydrocarbon fractions of different boiling ranges, wherein at least one heavy fraction can be employed as feedstream to the hydrocracking unit. A heavy fraction suitable as a feedstream to the hydrocracking unit preferably comprises hydrocarbons with a boiling range comprising a 5% boiling point equal to or greater than about 640° F. (representing hydrocarbons with about 20 or more carbon atoms or "$C_{20+}$ hydrocarbons"). In alternate embodiments, the heavy fraction may have a boiling range comprising a 5% boiling point of about 800° F. (representing hydrocarbons with about 30 or more carbon atoms or "$C_{30+}$ hydrocarbons"). It is to be understood that the type of fractionator is not critical and can comprise any suitable fractionator technology and/or methods. One of ordinary skill in the art may readily understand the types of fractionators useful for separating liquid hydrocarbons of this nature into the various fractions described herein. For ease of discussion, and without any intention to be so limited, the fractionator can comprise a standard atmospheric fractional distillation apparatus, a short-path distillation unit and/or a vacuum distillation column, preferably at least an atmospheric distillation apparatus.

When the hydrocracking unit employs a hydrocarbon feedstock comprising primarily synthetic hydrocarbons obtained from syngas, the conversion promoting conditions in the hydrocracking unit are preferably at a temperature of about 500° F. to about 750° F. (260-400° C.), more preferably at a temperature of about 570° F. to about 720°F. (300-380° C.), and at a pressure of about 500 psig to about 1500 psig (3,550-10,440 kPa), an overall hydrogen consumption of 50-10,000 standard cubic feet per barrel of hydrocarbon feed or scf $H_2$/bbl HC [about 9-1,800 STP $m^3$ $H_2$/$m^3$ HC feed], preferably 50-2,000 scf $H_2$/bbl HC, more preferably 100-1,000 scf $H_2$/bbl HC, still more preferably 150-800 scf $H_2$/bbl HC using a liquid hourly space velocities based on the hydrocarbon feedstock of about 0.1 to about 10 $hr^{-1}$, preferably between 0.25 to 5 $hr^{-1}$.

Fischer-Tropsch Synthesis

In a Fischer-Tropsch process, a syngas feed is fed to a hydrocarbon synthesis reactor. The syngas feed comprises hydrogen and carbon monoxide. It is preferred that the molar ratio of hydrogen to carbon monoxide in the syngas feed be greater than 0.5:1 (e.g., from about 0.67 to about 2.5). Preferably, when cobalt, nickel, iron, and/or ruthenium catalysts are used in the hydrocarbon synthesis reactor, the syngas feed comprises hydrogen and carbon monoxide in a molar ratio of about 1.4:1 to about 2.3:1, more preferably between about 1:7 to 2.2:1. The syngas feed may also comprise carbon dioxide. Moreover, the syngas feed preferably comprises a low concentration of compounds or elements that have a deleterious effect on the catalyst, such as poisons. For example, the syngas feed may be pretreated to ensure that it contains low concentrations of sulfur or nitrogen compounds such as hydrogen sulfide, hydrogen cyanide, ammonia and carbonyl sulfides. The syngas feed is contacted with the catalyst in a reaction zone. Mechanical arrangements of conventional design may be employed as the reaction zone including, for example, fixed bed, fluidized bed, slurry bubble column or ebullating bed reactors, among others. Accordingly, the preferred size and physical form of the catalyst particles may vary depending on the reactor in which they are to be used.

The hydrocarbon synthesis reactor is typically run in a continuous mode. In this mode, the gas hourly space velocity through the reaction zone typically may range from about 50 to about 10,000 $hr^{-1}$, preferably from about 300 $hr^{-1}$ to about 2,000 $hr^{-1}$. The gas hourly space velocity is defined as the volume of gaseous reactants per time per reaction zone volume. The volume of reactant gases is preferably at but not limited to standard conditions of pressure (101 kPa) and temperature (0° C.). The reaction zone volume is defined by the portion of the reaction vessel volume in which the reaction takes place and that is occupied by a gaseous phase comprising reactants, products and/or inerts; a liquid phase comprising liquid/wax products and/or other liquids; and a solid phase comprising catalyst. The reaction zone temperature is typically in the range from about 160° C. to about 300° C. Preferably, the reaction zone is operated at conversion promoting conditions at temperatures from about 190° C. to about 260° C., more preferably from about 205° C. to about 230° C. The reaction zone pressure is typically in the range of about 80 psia (552 kPa) to about 1,000 psia (6,895 kPa), more preferably from 80 psia (552 kPa) to about 800 psia (5,515 kPa), and still more preferably from about 140 psia (965 kPa) to about 750 psia (5,170 kPa). Most preferably, the reaction zone pressure is from about 250 psia (1,720 kPa) to about 650 psia (4,480 kPa).

The hydrocarbon synthesis reactor produces at least one hydrocarbon synthesis product, which primarily comprises hydrocarbons. The hydrocarbon synthesis product may also comprise oxygen-containing hydrocarbons, called oxygenates, such as alcohols, aldehydes, esters, aldols, and the like. The hydrocarbon synthesis product preferably comprises primarily hydrocarbons with 5 or more carbons atoms.

To further illustrate various illustrative embodiments of the present invention, the following examples are provided. It is understood that the examples are given by way of illustration and are not intended to limit the specification or the claims to follow in any manner.

EXAMPLES

Examples 1-8 illustrate different methods of preparation to make mixed amorphous silica-alumina materials of various acidities suitable as supports for hydrocracking catalysts. Specifically, Examples 1-4 illustrate a method of making low-acidity silica-alumina materials, Examples 5-6 illustrate a method of making higher-acidity silica-alumina materials, and Examples 7-8 illustrate a method of forming mixtures of two silica-alumina materials of different acidity according to this invention.

Example 1

Catalyst Based on a Low-Acidity Silica-Alumina Material

A low-acidity silica/alumina support with a molar ratio of silica-to-alumina of 30:1 was prepared by co-precipitating sodium aluminate and sodium silicate with the addition of diluted nitric acid. A hydrogel was obtained within 30 minutes. The gel was then aged for three days at room temperature. Thereafter, an ion exchange step was performed with a 1.0 molar ammonium nitrate solution to convert it from the $Na^+$ to $H^+$ form. Next, the hydrogel was washed with water to remove most of the ammonium nitrate. Finally, the gel was dried at 110° C. overnight and calcined in air at 550° C. for three hours. The resulting sample was then crushed and sieved to obtain particles of a suitable size (about 1 to 2 mm). Using this particulate support, the ion-exchange of platinum (0.3% Pt/$SiO_2$_$Al_2O_3$) was carried out by adding the above support to the $(NH_3)_4Pt(NO_3)_2$ solution. Finally, the catalyst precursor (Pt ion-exchanged support) was washed, dried, and calcined at 300° C. for 3 hours to form catalyst Example 1. The properties of the catalyst of Example 1 are shown in Table 1.

Example 2

Catalyst Based on a Low-Acidity Silica-Alumina Material

Another low-acidity silica/alumina material with a molar ratio of silica-to-alumina of 40:1 and catalyst Example 2 (0.3% Pt/$SiO_2Al_2O_3$) made therefrom were prepared by the same procedure as described for Example 1. The properties of the catalyst Example 2 are shown in Table 1.

Example 3

Catalyst Based on a Low-Acidity Silica-Alumina Material

Another low-acidity silica-alumina material with a molar ratio of silica-to-alumina of 40:1 and catalyst Example 3 (0.3% Pt/$SiO_2Al_2O_3$) made therefrom were prepared by the same procedure as described for Example 1 except that the platinum compound [$(NH_3)_4Pt(NO_3)_2$] was deposited by incipient wetness impregnation, instead of ion exchange. The properties of the catalyst Example 3 are shown in Table 1.

Example 4

Catalyst Based on a Low-Acidity Silica-Alumina Material

Another low-acidity silica/alumina support with a molar ratio of silica-to-alumina of 50:1 and catalyst Example 4 (0.3% Pt/SiO$_2$Al$_2$O$_3$) made therefrom were prepared by the same procedure as described for Example 1. The properties of the catalyst Example 4 are shown in Table 1.

Example 5

Catalyst Based on a Higher-Acidity Silica-Alumina Material

A higher-acidity silica/alumina material with a molar ratio of silica-to-alumina of 50:1 was prepared. First, Al(OH)$_3$ was dissolved in tertrapropylammonium hydroxide, then silicic acid was added to this ammonia solution while stirring. This mixture was reacted for 14 days at room temperature followed by three days at 70° C. It was then evaporated to dryness at 120° C. for 2 hours, washed to remove excess tertrapropylammonium hydroxide and dried again at 120° C. for 2 hours. Finally, the dried sample was calcined at 500° C. for 3 hours. The resulting sample was then crushed and sieved to obtain particles of desired size (about 1 to 2 mm) before use.

Using this higher-acidity silica/alumina material with a molar ratio of silica-to-alumina of 50:1, the ion-exchange of platinum (0.3% Pt/SiO$_2$Al$_2$O$_3$) was carried out by adding the above higher-acidity silica/alumina material to the (NH$_3$)$_4$Pt(NO$_3$)$_2$ solution. Finally, the catalyst precursor (Pt ion-exchanged support) was washed, dried, and calcined at 300° C. for 3 h to form catalyst Example 5. The properties of the resulting catalyst Example 5 are shown in Table 1.

Example 6

Catalyst Based on a Higher-Acidity Silica-Alumina Material

Another higher-acidity silica/alumina material with a molar ratio of silica-to-alumina of 80:1 and catalyst Example 6 (0.3% Pt/SiO$_2$Al$_2$O$_3$) made therefrom were prepared by the same procedure as described for Example 5. The properties of the catalyst Example 6 are shown in Table 1.

Example 7

Catalyst Based on a Calcined Mixture of Two Silica-Alumina Gels

A low-acidity silica/alumina material with a molar ratio of silica-to-alumina of 80:1 was prepared according to the procedure described in Example 1 up to the wash step with water to remove most of the ammonium nitrate to obtain a low-acidity silica-alumina (LASA) gel. Another silica/alumina support with a molar ratio of silica-to-alumina of 80:1 was prepared according to the procedure for the silica-alumina material for Example 5 up to the wash step to remove excess tertrapropylammonium hydroxide to obtain a higher-acidity silica-alumina (HASA) gel. Finally, both LASA and HASA gels were mixed together, and the gel mixture was then dried at 110° C. overnight (about 16 hours) and calcined in air at 550° C. for 3 hours. The resulting calcined sample was then crushed and sieved before use to form a particulate silica-alumina support with a molar silica-to-alumina ratio of 80:1. Using this particulate support, the ion-exchange of platinum (0.3% Pt/SiO$_2$Al$_2$O$_3$) was carried out by adding the above support to a (NH$_3$)$_4$Pt(NO$_3$)$_2$ solution. Finally, the catalyst precursor (Pt ion-exchanged support) was washed, dried, and calcined at 300° C. for 3 hours to finally form catalyst Example 7. The properties of the catalyst Example 7 is shown in Table 1.

Example 8

Catalyst Based on a Physical Mixture of Two Silica-Alumina Materials

A low-acidity silica/alumina material (LASA) with a molar ratio of silica-to-alumina of 50:1 was prepared according to the procedure described in Example 1 up to the calcination in air at 550° C. for three hours followed by crushing and passing through a sieve to form particles of a desired size (about 1 to 2 mm). Another higher-acidity silica/alumina material (HASA) with a molar ratio of silica-to-alumina of 80:1 was prepared according to the procedure for the silica-alumina material for Example 5 up to the calcination at 500° C. for 3 hours and passing through a sieve to form particles of desired size (about 1 to 2 mm). Finally, both sets of LASA and HASA particles were mixed together in the weight ratio of 1:1 to form the support. The ion-exchange of platinum (0.3% Pt/SiO$_2$Al$_2$O$_3$) was carried out by adding the above support (mixed LASA and HASA particles) to the (NH$_3$)$_4$Pt(NO$_3$)$_2$ solution. Finally, the catalyst precursor was washed, dried, and calcined at 300° C. for 3 hours to form catalyst Example 8. The properties of the catalyst Examples 8 are shown in Table 1.

Example 9

Characterization of Physical Properties of Examples 1-8

The BET surface area, BJH pore volume, and average pore diameter of the supports of Examples 1-8 were measured by nitrogen physical adsorption. The aluminum content of some of the catalyst examples were determined by atomic absorption spectrophotometry in a Spectra A-plus (Varian) apparatus. The platinum content was quantified by ion chromatography. Results are tabulated in Table 1. As observed, catalyst Examples 5-8 presented the highest BET surface area (540-620 m$^2$/g), while the other four catalyst Examples 1-4 showed a BET surface area of about 400-420 m$^2$/g. Additionally, catalyst Examples 5, 7 and 8 catalysts presented the lowest BJH pore diameter, 4.0 nm, 5.7 nm and 4.4 nm, respectively. As can be observed also in Table 1, all catalyst Examples had a nominal Pt content close to 0.2-0.3 wt %. The measured alumina content correlated well with the expected silica-to-alumina ratio.

TABLE 1

Properties of the Hydrocracking Catalyst Examples 1–8

| EX. | SiO$_2$/Al$_2$O$_3$ Molar Ratio | Al$_2$O$_3$ content, wt % | Silica-alumina Material Type | BET Surface Area m$^2$/g | Total Pore Volume ml/g | Avg Pore Dia. nm | Pt. % |
|---|---|---|---|---|---|---|---|
| 1 | 30 | 4.4 | LASA | 407 | 0.75 | 7.4 | 0.21 |
| 2 | 40 | 3.4 | LASA | 401 | 0.81 | 8.0 | 0.18 |
| 3 | 40 | — | LASA | 415 | 0.90 | 8.7 | nd |
| 4 | 50 | — | LASA | 419 | 0.76 | 7.3 | 0.19 |
| 5 | 50 | — | HASA | 616 | 0.62 | 4.0 | 0.29 |
| 6 | 80 | 1.9 | HASA | 540 | 0.91 | 6.7 | 0.26 |
| 7 | 80 | 1.8 | LASA + HASA Mixed gels (1:1) | 575 | 0.81 | 5.7 | 0.28 |
| 8 | 50 | 2.7 | LASA + HASA Physical Mix (1:1) | 549 | 0.64 | 4.7 | 0.25 |

Example 10

Acidity Measurement

The acidity of the Examples 1, 2, 4, 6, 7 and 8 was measured by infrared spectroscopy with adsorption-desorption of pyridine in a Nicolet 710 FTIR apparatus. A sample of each of the Examples 1, 2, 4, 6, 7 and 8 was previously degassed at 400° C. in vacuum (10$^{-3}$ Pa) overnight to obtain a background spectrum for each sample. Then, a pressure (6×10$^2$ Pa) of pyridine was admitted at room temperature and degassed at different temperatures (150° C., 250° C., 350° C.) for 1 hour. After each treatment, spectra were recorded at room temperature and each respective background spectrum was substracted. The density of Brönsted and Lewis acid sites was determined from the intensities of the bands at two wavelengths of about 1,545 cm$^{-1}$ (characteristic of pyridine on a Brönsted acid site) and 1,450 cm$^{-1}$ (characteristic of pyridine on a Lewis acid site), respectively, using the molar extinction coefficients 1.67 cm/µmol and 2.22 cm/µmol, respectively, for Brönsted and Lewis acid sites, said molar extinction coefficients being reported by Emeis (1993, "Determination of Integrated Molar Extinction Coefficients for Infrared Adsorption Bands of Pyridine Adsorbed on Solid Acid Catalysts," *J. Catal.*, 141, 347-354.).

The density and strength distribution of the acid sites of the Examples studied (Brönsted sites are strong acid sites and Lewis sites are weak acid sites), as determined by IR-pyridine experiments, are shown in Table 2a. As observed, the catalysts of Examples 6 and 8 showed the highest total Brönsted acidity (after desorption of pyridine at 150° C.). For the other four catalyst Examples 1, 2, 4 and 7, the acidity is weak because no Brönsted sites at a temperature greater than 250° C. were observed.

The spacing of the strong acid sites was estimated by calculating the inter-Brönsted site distance by the following equation:

$$\text{Inter-Brönsted distance (nm)} = (SA/\text{acid site density}/N_A)^{0.5}$$

wherein SA represents the surface area in nm$^2$/g; the acid site density represents the Brönsted acid site density measured at 150° C. in mol pyr/g; and $N_A$ represents the Avogadro's number of 6.022 10$^{23}$ mol$^{-1}$. The results for Inter-Brönsted distances are shown in Table 2a.

The spacing of the metal sites was estimated by calculating the inter-platinum distance by the following equation:

$$\text{Inter-Pt distance (nm)} = (SA/\text{Pt site density}/N_A)^{0.5}$$

wherein SA represents the surface area in nm$^2$/g; $N_A$ represents the Avogadro's number of 6.02 10$^{23}$ moles$^{-1}$; and Pt site density represents the density of platinum metal sites dispersed on the support in mol Pt/g; and the Pt site density is calculated based on the weight content of Pt divided by the Pt molecular weight and multiplied by Pt dispersion. The results for Inter-Pt distance and for the Inter-Brönsted/Inter-Pt ratio are shown in Table 2b.

Example 8 based on mixed silica-alumina materials comprised an Inter-Brönsted/Inter-Pt ratio of 1.08 approaching equidistance between acid sites and metal sites. The ratio of Example 8 was in between that (0.85) of the higher-acidity silica-alumina based catalyst Example 5 and those (1.27-1.52) of the low-acidity silica-alumina based catalyst Examples 1, 2 and 4. On the other end, Example 7, which was based on the calcination product of two mixed silica-alumina gels, had a much higher Inter-Brönsted/Inter-Pt ratio of 1.77 compared to those (1.27-1.52) of the low-acidity silica-alumina based catalyst Examples 1, 2 and 4, indicating that the acid sites were spaced even more than the metal sites. Hence, the methods of preparation of silica-alumina support (either by mixing silica-alumina gels and calcining the gel mixture or by mixing calcined silica-alumina materials) allowed the adjustment of the ratio of acid site distance to metal site distance, independent of the selected silica-to-alumina ratio of the prepared silica-alumina support.

Tables 2a; 2b; 2c. Properties of catalysts on various amorphous silica-aluminas.

TABLE 2a

| | Acidity (µmol pyridine/g sample) | | | | | | Brösted Acid Density nmol pyr/m$^2$ | Inter-Brösted Distance nm |
|---|---|---|---|---|---|---|---|---|
| | Brösted | | | Lewis | | | | |
| Example | 150° C. | 250° C. | 350° C. | 150° C. | 250° C. | 350° C. | 150° C. | 150° C. |
| 1 | 2.7 | 0 | 0 | 21.8 | 16.3 | 9.3 | 6.6 | 15.8 |
| 2 | 2.7 | 0 | 0 | 20.6 | 13.8 | 9.2 | 6.7 | 15.7 |
| 4 | 3.1 | 0 | 0 | 18.9 | 13.2 | 7.4 | 7.4 | 15.0 |
| 6 | 6.7 | 2.7 | 0 | 27.0 | 22.0 | 14.1 | 12.4 | 11.6 |
| 7 | 2.7 | 0 | 0 | 19.4 | 17.6 | 10.9 | 4.7 | 18.8 |
| 8 | 4.5 | 1.8 | 0 | 23.6 | 19.3 | 10.2 | 8.2 | 14.2 |

TABLE 2b

| Example | Loaded Pt. Wt % | Pt Dispersion % | Pt site Density μmol/g | Inter-Pt Distance nm | Inter-Brösted/ Inter-Pt Ratio nm/nm |
|---|---|---|---|---|---|
| 1 | 0.21 | 58 | 6.24 | 10.4 | 1.52 |
| 2 | 0.18 | 51 | 4.71 | 11.9 | 1.32 |
| 4 | 0.19 | 51 | 4.97 | 11.8 | 1.27 |
| 6 | 0.26 | 36 | 4.80 | 13.7 | 0.85 |
| 7 | 0.28 | 59 | 8.46 | 10.6 | 1.77 |
| 8 | 0.25 | 41 | 5.25 | 13.2 | 1.08 |

TABLE 2c

| Example | $SiO_2/Al_2O_3$ Molar Ratio in the support | Estimated Al Content in the support mol % | BET surface area $m^2/g$ | Brösted Acidity of the catalyst at 150° C. μmol pyridine/g | Normalized Brösted acidity (based on Al content) nmol pyridine/$m^2$ /mol % Al |
|---|---|---|---|---|---|
| 1 | 30 | 3.23 | 407 | 2.7 | 2.05 |
| 2 | 30 | 3.23 | 401 | 2.7 | 2.08 |
| 4 | 40 | 2.44 | 419 | 3.1 | 3.03 |
| 6 | 80 | 1.23 | 540 | 6.7 | 10.09 |
| 7 | 80 | 1.23 | 575 | 2.7 | 3.82 |
| 8 | 50 | 1.96 | 549 | 4.5 | 4.18 |

The acidity of amorphous silica-alumina material is correlated with the aluminum content of the material. Hence, the Brönsted acidity of catalyst Examples 1, 2, 4, 6, 7, and 8 was normalized by the aluminum content and the BET surface area of the silica-alumina support. The results on the normalized Brönsted acidity are shown in Table 2c. The two catalyst Examples 7 and 8 according to the present invention, which comprised mixed amorphous silica-aluminas, comprised a normalized Brönsted acidity that was between those of the Examples 1, 2, and 4 based on a low-acidity silica alumina and that of Example 6 based on a higher-acidity silica alumina.

Example 11

Catalyst Performance of Examples 1, 2, 4, 6, 7 and 8

Hydrocracking of hexadecane (n-$C_{16}$) was performed in a continuous down flow fixed bed tubular reactor operated at 4.0 MPa total pressure, hydrogen-to-hexadecane molar ratio of 90, and weight hourly space velocity (WHSV) of 3.6 $h^{-1}$. The conversion of n-$C_{16}$ was varied by changing the reaction temperature. The reactor was loaded with 1.6 g of a catalyst sample of each of Examples 1, 2, 4, 6, 7 and 8, which was crushed and sieved to a particle size of 0.25-0.42 mm and then diluted with silicon carbide 0.6-0.8 mm particles until a total surface to volume ratio of 5.5 $cm^{-1}$. Prior to catalytic tests, the catalyst samples were reduced in situ at atmospheric pressure and at 450° C. for 2 hours with pure hydrogen.

All products leaving the reactor were analyzed on-line in a GC (Varian Star 3800 CX) equipped with a capillary column (Petrocol DH 50.2TM, 50 m×0.2 mm, 0.5 μm film, SUPELCO) and a flame ionization detector (FID). To avoid condensation of the heaviest hydrocarbons, all transfer lines from the reactor to the GC were carefully heated at about 300° C. while passing a nitrogen stream of 1400 $cm^3$/min to dilute and sweep the product stream.

The n-hexadecane conversion versus reaction temperature is shown in FIG. 1. As expected, a higher conversion of n-hexadecane was observed for the catalyst Examples with the higher total Brönsted acidity (i.e., Examples 6 and 8). The order of activity found was the following: Examples 8>6>7>1>2=4. The catalyst of Example 7 displayed a higher activity for n-hexadecane hydrocracking than the rest of the catalyst Examples tested with the same total Brönsted acidity (Examples 1, 2 and 4). This catalyst of Example 7 presented also a higher BET surface area and a lower pore diameter than the other catalyst Examples 1, 2, and 4 with low acidity (see Table 2).

Figure 4:
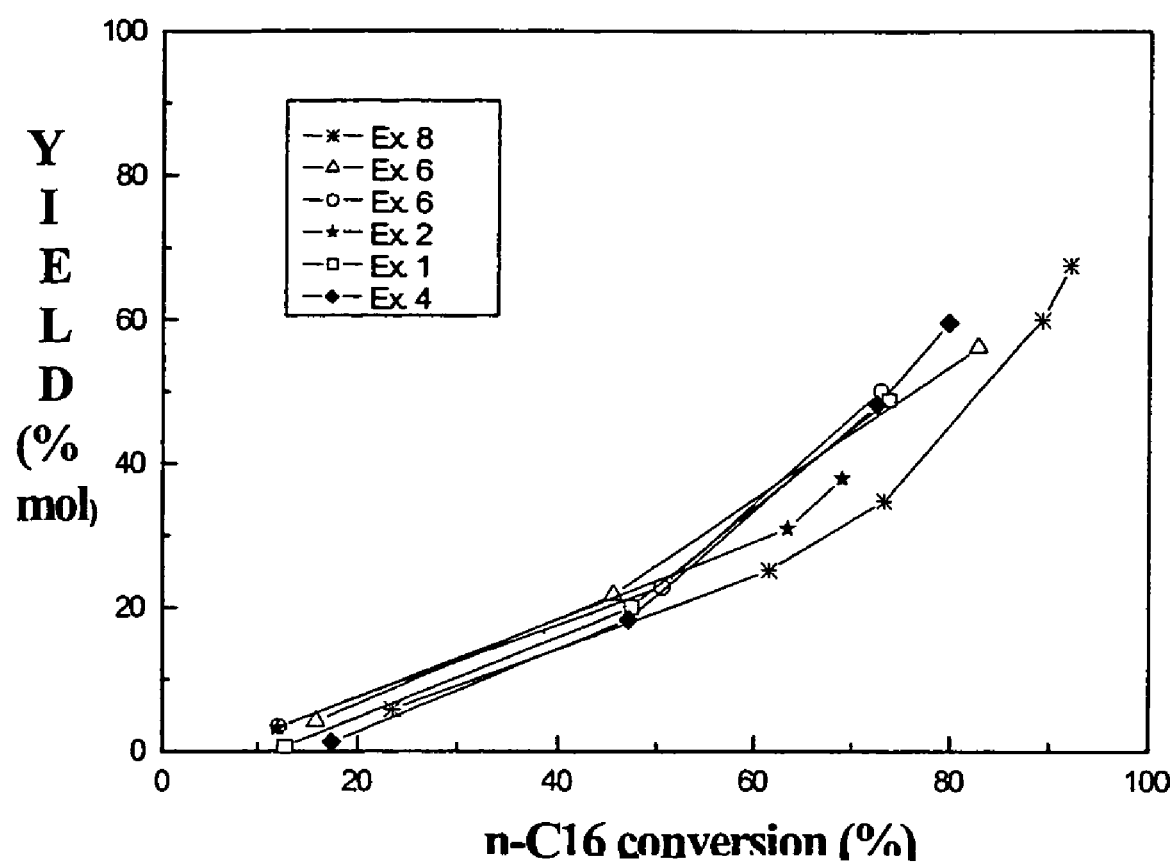
FIG. 4 illustrates a plot of yield versus n-hexadecane (n-$C_{16}$) conversion.

FIGS. 3a-3f show the selectivities to hydroisomerization and hydrocracking as a function of n-$C_{16}$ conversion for the six catalyst Examples tested. As observed, hydrocracking selectivity increased with n-$C_{16}$ conversion for all catalysts studied. On the other hand, all tested catalyst Examples showed similar hydrocracking yield when compared at a constant conversion of hexadecane of 50%, as can be observed in FIG. 4.

In FIGS. 5a-5f, the distribution of the hydrocracked products ($C_1$-$C_{15}$) by carbon numbers at similar hydrocracking yields (ca. 40-60 mol %) are shown. As observed, the distribution of hydrocracked products was similar for all the tested catalyst Examples 1, 2, 4, 6, 7, and 8, showing a maximum at $C_5$-$C_6$ hydrocarbons. This maximum was more pronounced for the catalysts with the higher Brönsted acidity (i.e., Examples 6 and 8), but catalyst Examples 1 and 4 produce less re-cracking or secondary cracking.

Figure 6:
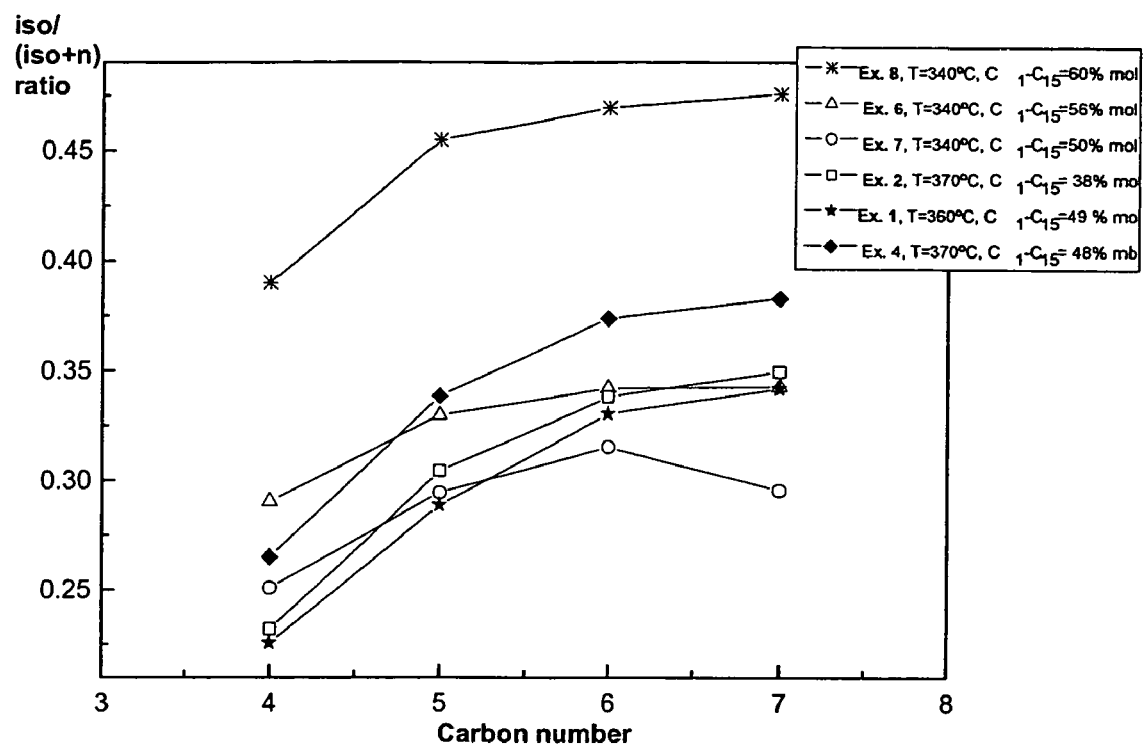
FIG. 6 illustrates iso/(iso+n) ratios at hydrocracking yields.

The concentration of branched hydrocarbons in the hydrocracked products was also calculated. The iso/(iso+n) ratios for the six catalysts evaluated at "similar" hydrocracking yields (ca. 40-60 mol %) are compared in FIG. 6. The concentration of branched hydrocarbons in $C_4$-$C_7$ range increased with the carbon number for all of the tested catalyst Examples, with the exception of Example 7, which showed a slight decrease at $C_7$. For the three catalysts of Examples 6, 7, and 8 compared at the same reaction temperature (340° C.), the concentration of isomers in the hydrocracking products increased with the Brönsted acidity of the sample, that is: Ex. 7<Ex. 6<Ex. 8. For the remainder of the catalyst Examples compared at a temperature of ca. 360-370° C., the order found was Ex. 1<Ex. 2<Ex. 4.

Finally, in Table 3, the $C_4/C_{12}$ molar ratio obtained with n-hexadecane as feedstock over the six catalyst Examples tested at a similar hexadecane yield (ca. 40-60 mol %) are shown. The $C_4/C_{12}$ molar ratio is a good representation of selectivity of the catalysts. A low value for the $C_4/C_{12}$ molar ratio is desirable for a good diesel product selectivity in a commercial application. In agreement with the results from FIG. 6, catalysts of Examples 1, 2 and 4 give the most desirable lower $C_4/C_{12}$ ratios. Example 7, which represented a calcined mixture of a HASA gel and a LASA gel, showed a similar $C_4/C_{12}$ molar ratio and conversion to the low-acidity catalyst Examples 1, 2, and 4, but the performance was obtained at a temperature of 340° C., 20 to 30° C. lower than for Examples 1, 2 and 4. Example 8, which represented a physical mixture of a calcined HASA material and a calcined LASA material, showed a similar $C_4/C_{12}$ molar ratio than the higher-acidity catalyst Example 6 but provided a higher hydrocracking yield than Example 6.

TABLE 3

$C_4/C_{12}$ molar ratio in hydrocracked product.

| Catalyst | T(° C.) | Hydrocracking yield (mol %) | $C_4/C_{12}$ molar ratio |
|---|---|---|---|
| 1 | 360 | 49 | 1.5 |
| 2 | 370 | 38 | 1.8 |
| 4 | 370 | 48 | 1.6 |
| 6 | 340 | 56 | 2.0 |
| 7 | 340 | 50 | 1.8 |
| 8 | 340 | 60 | 2.0 |

Example 12

Catalyst Performance of Examples 3, 6 and 8

Hydrocracking of hexadecane (n-$C_{16}$) has been performed in another hydrocracking apparatus, which employed a sample of hydroprocessing catalyst Examples 3, 6 and 8. In the procedure, a 10-g sample of catalyst was mixed with 60 g of 0.71 mm-0.60 mm glass beads (made of sodalime glass from Mo-Sci corporation, Rolla, Mo.) and loaded into a tubular reactor (I.D. of about 2.1 cm length of about 45 cm) with an axial thermowell (O.D of about 6.3 mm) running through the center. The catalyst was brought up at a temperature of about 150° C. at atmospheric pressure under hydrogen for about 2 hours. The temperature was raised to 375° C., and the catalyst reduced under a flow of hydrogen of 7.5 normal liters per hour (also at atmospheric pressure). The reactor was then cooled to reaction temperature (about 567-568° F.), and the pressure in the tubular reactor was increased to 500 psig (about 3.5 MPa) under the mixed flow of hydrogen (180 scm³/min) and nitrogen (9 scm³/min). The temperature of the reactor was adjusted until the mole fraction of hexadecane in the product stream was close to 0.4.

Hexadecane was added at a liquid flow rate of 0.22 ml/min using a HPLC pump for a hydrogen-to-hexadecane feed molar ratio of about 11.9. The liquid product was collected in a two stage knock-out system with the residual tail gas being analyzed on-line. The liquid product was analyzed off-line by a gas chromatograph (with a FID detector). Table 4 illustrates the catalyst run conditions. The results are shown in Table 5.

TABLE 4

| Process conditions | |
|---|---|
| Catalyst Weight, g | 10 |
| Reactor Temperature | Adjusted to reach about 50-60% conversion |
| Reactor Temperature ° C. | 304-329 |
| Pressure, psig | 500 |
| WHSV, /hr | 1.2 |
| $H_2$/Hexadecane, mol/mol | 11.9 |

TABLE 5

Conversion of hydrocracking catalysts on different silica-alumina materials.

| Catalyst Example | Temperature (° F.) | Temperature (° C.) | Conversion % | Molar ratio $C_4/C_{12}$ |
|---|---|---|---|---|
| 3 (on LASA) | 625 | 329 | 55.6 | 3.18 |
| 6 (on HASA) | 580 | 304 | 51.5 | 2.33 |
| 7 (on HASA + LASA) | 596 | 312 | 57.0 | 2.86 |

Catalyst Example 7 comprising a mixture of a low-acidity silica-alumina material (LASA) and a higher-acidity silica-alumina material (HASA) produced a $C_4/C_{12}$ molar ratio of 2.86 in between those of catalyst Examples based on the pure LASA and HASA materials at relatively similar hexadecane conversion. This demonstrated that one could modulate the selectivity of a hydrocracking catalyst by physical mixing of silica-alumina materials of different acidity.

Although the present invention and its advantages have been described in detail, it should be understood that various changes, substitutions and alterations may be made herein without departing from the spirit and scope of the invention as defined by the appended claims.

What is claimed is:

1. A hydrocracking catalyst, comprising:
a catalytic metal comprising a Group 6 metal, a Group 8 metal, a Group 9 metal, a Group 10 metal, or combinations thereof; and
an amorphous catalyst support comprising a mixture of a first amorphous material and a second amorphous material, wherein the first amorphous material comprises a Brönsted acidity measured at 150° C. between about 0.1 μmol pyridine/g and about 4 μmol pyridine/g; and the second amorphous material comprising a Brönsted acidity that differs by at least 1 μmol pyridine/g from that of the first amorphous material.

2. The catalyst of claim 1, wherein the first amorphous material comprises silica-alumina, silica-titania, silica-magnesia, or alumina-titania; and wherein the second amorphous material comprises silica-alumina, silica-titania, silica-magnesia, or alumina-titania.

3. The catalyst claim 1, wherein the first amorphous material and the second amorphous material comprise silica-alumina.

4. The catalyst of claim 1, wherein the amorphous catalyst support has a Brönsted acidity between about 2.5 μmol pyridine/g and about 7 μmol pyridine/g.

5. The catalyst of claim 1, wherein the Brönsted acidity of the first amorphous material is between about 1 μmol pyridine/g and about 3 μmol pyridine/g.

6. The catalyst of claim 1, wherein the Brönsted acidity of the second amorphous material is between about 4 μmol pyridine/g and about 7 μmol pyridine/g.

7. The catalyst of claim 1, wherein the mixture comprises a weight ratio of the first amorphous material to the second amorphous material between about 5:95 and about 95:5.

8. The catalyst of claim 1, wherein the mixture comprises a weight ratio of the first amorphous material to the second amorphous material between about 1:3 and about 3:1.

9. The catalyst of claim 1, wherein the catalytic metal comprises a noble metal selected from the group consisting of palladium, platinum, and combinations thereof.

10. The catalyst of claim 1, wherein the catalytic metal comprises a non-noble metal selected from the group consisting of Ni, Co, W, Mo, and any combinations of two or more thereof.

11. A method for making a hydrocracking catalyst comprising an amorphous catalyst support and a catalytic metal selected from the group consisting of a Group 6 metal, a Group 8 metal, a Group 9 metal, a Group 10 metal, and combinations thereof, said method comprising the following steps:
(A) providing a first amorphous material and a second amorphous material, wherein the first amorphous material comprises a Brönsted acidity between 0 µmol pyridine/g and about 4 µmol pyridine/g, and wherein the second amorphous material comprises a Brönsted acidity that differs by at least 1 µmol pyridine/g from that of the first amorphous material;
(B) mixing the first amorphous material and the second amorphous material to form a mixture;
(C) either treating the mixture or separately treating the first and second amorphous materials before the mixing step so as to form the amorphous catalyst support; and
performing one of the following deposition steps selected from the group consisting of:
depositing the catalytic metal on the amorphous catalyst support;
separately depositing the catalytic metal to the first amorphous material and the second amorphous material in step (A); and
depositing the catalytic metal to the first amorphous material and the second amorphous material during step (B).

12. The method of claim 11, wherein the amorphous catalyst support has a Brönsted acidity between about 2.5 µmol pyridine/g and about 7 µmol pyridine/g.

13. The method of claim 11 wherein the first amorphous material comprises silica-alumina, silica-titania, silica-magnesia, or alumina-titania; and wherein the second amorphous material comprises silica-alumina, silica-titania, silica-magnesia, or alumina-titania.

14. The method of claim 11 wherein the first amorphous material and the second amorphous material comprise silica-alumina.

15. The method of claim 11 wherein the Brönsted acidity of the first amorphous material is between about 1 µmol pyridine/g and about 3 µmol pyridine/g.

16. The method of claim 11 wherein the Brönsted acidity of the second amorphous material is between about 4 µmol pyridine/g and about 7 µmol pyridine/g.

17. The method of claim 11 wherein step (A) further comprises preparing a first gel comprising the first amorphous material and a second gel comprising the second amorphous material.

18. The method of claim 17, wherein mixing the first amorphous material and the second amorphous material of step (B) comprises mixing the first gel and the second gel to form a gel mixture, and wherein the mixture comprises the gel mixture, and further wherein the treating step (C) comprises calcining the gel mixture.

19. The method of claim 11 wherein the mixture comprises a weight ratio of the first amorphous material to the second amorphous material between about 5:95 and about 95:5.

20. The method of claim 11 wherein the mixture comprises a weight ratio of the first amorphous material to the second amorphous material between about 1:10 and about 10:1.

21. The method of claim 11 wherein the mixture comprises a weight ratio of the first amorphous material to the second amorphous material between about 1:3 and about 3:1.

22. A method for hydrocracking a hydrocarbon fraction, comprising:
(A) providing a hydrocracking catalyst, wherein the hydrocracking catalyst comprises
(1) a catalytic metal comprising a Group 6 metal, a Group 8 metal, a Group 9 metal, a Group 10 metal, or combinations thereof and
(2) an amorphous support, wherein the amorphous support comprises a mixture of a first amorphous material comprising a Brönsted acidity between 0 µmol pyridine/g and about 4 µmol pyridine/g and a second amorphous material comprising a Brönsted acidity that differs by at least 1 µmol pyridine/g from that of the first amorphous material; and
(B) reacting the hydrocarbon fraction with hydrogen over the hydrocracking catalyst to form a hydrocracked product.

23. The method of claim 22, wherein the catalytic metal comprises a Group 6 metal.

24. The method of claim 22, wherein the catalytic metal comprises a noble metal.

25. The method of claim 22, wherein the catalytic metal comprises platinum, palladium, or combinations thereof.

26. The method of claim 22, wherein the first amorphous material comprises silica-alumina, silica-titania, silica-magnesia, or alumina-titania; and wherein the second amorphous material comprises silica-alumina, silica-titania, silica-magnesia, or alumina-titania.

27. The method of claim 22, wherein the first amorphous material and the second amorphous material comprise silica-alumina.

28. The method of claim 22, wherein the amorphous support comprises a Brönsted acidity between about 2.5 µmol pyridine/g and about 7 µmol pyridine/g.

29. The method of claim 22, wherein the Brönsted acidity of the first amorphous material is between about 1 µmol pyridine/g and about 3 µmol pyridine/g.

30. The method of claim 22, wherein the Brönsted acidity of the second amorphous material is between about 4 µmol pyridine/g and about 7 µmol pyridine/g.

31. The method of claim 22, wherein the mixture comprises a weight ratio of the first amorphous material to the second amorphous material between about 5:95 and about 95:5.

32. The method of claim 22, wherein the mixture comprises a weight ratio of the first amorphous material to the second amorphous material between about 1:3 and about 3:1.

33. The method of claim 22, wherein the hydrocarbon fraction comprises a hydrocarbon product of a hydrocarbon synthesis process.

34. A hydrocracking catalyst, comprising:
a catalytic metal comprising a Group 6 metal, a Group 8 metal, a Group 9 metal, a Group 10 metal, or any combination thereof and
a catalyst support comprising:
a mixture of a first amorphous silica-alumina material and a second amorphous silica-alumina material, wherein the first amorphous silica-alumina material and the second amorphous silica-alumina differ in at least one property selected from the group consisting of acid strength, Brönsted acidity, Lewis acidity, acidity index, and silica-to-alumina molar ratio.

35. The catalyst of claim 34, wherein each of the first and second silica-alumina materials comprises a Brönsted acidity, and wherein the Brönsted acidity of the second amorphous silica-alumina material differs by least 1 μmol pyridine/g from that of the first amorphous silica-alumina material.

36. The catalyst of claim 34, wherein the first and second amorphous silica-alumina materials are derived from two synthesized silica-alumina gels.

37. The catalyst of claim 36, wherein the two synthesized silica-alumina gels have the same silica-to-alumina molar ratio.

38. The catalyst of claim 36, wherein the two synthesized silica-alumina gels are synthesized by using different silicon precursor compounds and different aluminum precursor compounds to effect a difference in acidity.

39. The catalyst of claim 36, wherein the catalyst support is made by one of the following methods:
separately calcining said synthesized silica-alumina gels to form two calcined amorphous silica-aluminas and then mixing said calcined amorphous silica-aluminas; or
mixing said synthesized silica-alumina gels to form a gel mixture, and then calcining the gel mixture.

40. The catalyst of claim 39, wherein the calcining step in either method is carried out at a temperature between about 400° C. and about 600° C.

41. The catalyst of claim 34, wherein the catalyst support is essentially free of zeolitic material.

42. The catalyst of claim 34, wherein the catalyst support has a Brönsted acidity between about 2.5 μmol pyridine/g and about 7 μmol pyridine/g.

43. The catalyst of claim 34, wherein the catalyst support has a BET surface area between about 300 m$^2$/g and about 800 m$^2$/g.

44. The catalyst of claim 34, wherein the catalyst support has a total pore volume between about 0.5 ml/g and about 1.2 ml/g.

45. The catalyst of claim 34, wherein the catalyst support has an average pore size between about 2 nm and about 12 nm.

46. The catalyst of claim 34, wherein the catalyst support has a Brönsted acidity between about 4 μmol pyridine/g and about 13 μmol pyridine/g.

47. The catalyst of claim 34, wherein the catalytic metal comprises a noble metal selected from the group consisting of palladium, platinum, and combinations thereof.

48. The catalyst of claim 47, wherein the hydrocracking catalyst comprises said noble metal in an amount from about 0.05 percent by weight to about 2 percent by weight per total weight of the hydrocracking catalyst.

49. The catalyst of claim 34, wherein the catalytic metal comprises a non-noble metal selected from the group consisting of Ni, Co, W, Mo, and any combinations of two or more thereof.

* * * * *